US012675978B2

(12) United States Patent (10) Patent No.: US 12,675,978 B2
Suzuki (45) Date of Patent: Jul. 7, 2026

(54) DATA COLLECTION SYSTEM, SENSOR DEVICE, DATA COLLECTION DEVICE, AND DATA COLLECTION METHOD

(71) Applicant: SONY GROUP CORPORATION, Tokyo (JP)

(72) Inventor: Kenji Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 649 days.

(21) Appl. No.: 18/003,552

(22) PCT Filed: Jun. 21, 2021

(86) PCT No.: PCT/JP2021/023319
§ 371 (c)(1),
(2) Date: Dec. 28, 2022

(87) PCT Pub. No.: WO2022/009652
PCT Pub. Date: Jan. 13, 2022

(65) Prior Publication Data
US 2023/0237774 A1     Jul. 27, 2023

(30) Foreign Application Priority Data

Jul. 7, 2020     (JP) ................................. 2020-117369

(51) Int. Cl.
*G06V 10/774*        (2022.01)
*G06F 21/62*         (2013.01)
(Continued)

(52) U.S. Cl.
CPC ........ *G06V 10/774* (2022.01); *G06F 21/6254* (2013.01); *G06V 10/82* (2022.01);
(Continued)

(58) Field of Classification Search
CPC ...... G06V 10/774; G06V 10/82; G06V 40/16; G06V 40/178; G06F 21/6254; G06F 21/6245; H04N 7/183; G06N 20/00
See application file for complete search history.

(56) References Cited

U.S. PATENT DOCUMENTS

| 10,419,728 B2 * | 9/2019 | Usie | ....................... | G06F 21/554 |
| 11,615,644 B2 * | 3/2023 | Yuan | ..................... | G06F 18/214 |
| | | | | 382/118 |

(Continued)

FOREIGN PATENT DOCUMENTS

| JP | 2014-085796 A | 5/2014 |
| JP | 2019-159959 A | 9/2019 |

(Continued)

OTHER PUBLICATIONS

International Search Report and Written Opinion of PCT Application No. PCT/JP2021/023319, issued on Aug. 17, 2021, 09 pages of ISRWO.

(Continued)

*Primary Examiner* — Wesley J Tucker
(74) *Attorney, Agent, or Firm* — CHIP LAW GROUP

(57) ABSTRACT
A data collection system according to the present disclosure includes: a sensor device that collects data; and
  a server device including a learning model that performs output according to a learning result, corresponding to input, and a data analysis unit that specifies data that is beneficial for or lacking in training of the learning model. The server device transmits, to the sensor device, a request signal for collecting data that is beneficial for or lacking in the training specified by the data analysis unit, or data similar to the data, the sensor device collects data that is beneficial for or lacking in the training, or similar data based on the received request signal, and transmits the collected data to the
(Continued)

server device, and the server device retrains the learning model based on the data transmitted from the sensor device.

19 Claims, 9 Drawing Sheets

(51) Int. Cl.
  *G06V 10/82*      (2022.01)
  *G06V 40/16*      (2022.01)
  *H04N 7/18*      (2006.01)
(52) U.S. Cl.
  CPC ............ *G06V 40/16* (2022.01); *G06V 40/178* (2022.01); *H04N 7/183* (2013.01)

(56) References Cited

U.S. PATENT DOCUMENTS

| | | | | |
|---|---|---|---|---|
| 12,318,160 | B2 * | 6/2025 | Chiu ..................... | A61B 34/37 |
| 2001/0024233 | A1 * | 9/2001 | Urisaka ............... | H04N 23/661 |
| | | | | 348/E7.086 |
| 2007/0097421 | A1 * | 5/2007 | Sorensen ............... | G06F 16/58 |
| | | | | 707/E17.031 |
| 2013/0311001 | A1 * | 11/2013 | Hampiholi .............. | B60R 25/25 |
| | | | | 701/1 |
| 2015/0379072 | A1 * | 12/2015 | Dirac .................... | G06N 20/00 |
| | | | | 707/693 |
| 2016/0132719 | A1 * | 5/2016 | Fithian ................. | G06F 18/214 |
| | | | | 345/647 |
| 2017/0178476 | A1 * | 6/2017 | Jeon ...................... | H04N 23/64 |
| 2018/0018508 | A1 * | 1/2018 | Tusch ................... | G06V 20/52 |
| 2018/0330258 | A1 * | 11/2018 | Harris .................... | G06N 7/01 |
| 2019/0026657 | A1 * | 1/2019 | Zhou ..................... | G06N 20/00 |
| 2019/0068895 | A1 * | 2/2019 | Hutz ................. | G06F 18/24143 |
| 2019/0114487 | A1 * | 4/2019 | Vijayanarasimhan ...................... |  |
| | | | | G06V 20/30 |
| 2019/0187785 | A1 * | 6/2019 | Kim ........................ | G10L 25/63 |
| 2021/0174347 | A1 * | 6/2021 | Rose ................... | H04L 63/0428 |
| 2021/0383100 | A1 * | 12/2021 | Dahlkamp ............ | G06F 21/602 |
| 2022/0198454 | A1 * | 6/2022 | Horiuchi ................. | G07G 1/14 |
| 2022/0319232 | A1 * | 10/2022 | Kim ........................ | G06V 40/50 |
| 2022/0384053 | A1 * | 12/2022 | Nonaka .................. | G16H 50/50 |
| 2023/0108162 | A1 * | 4/2023 | Yokoyama ............. | G06N 5/022 |
| | | | | 706/12 |
| 2023/0300173 | A1 * | 9/2023 | Roach ................ | H04L 63/0853 |
| | | | | 726/4 |
| 2023/0394179 | A1 * | 12/2023 | Aoyagi .................. | G06F 21/64 |

FOREIGN PATENT DOCUMENTS

| | | |
|---|---|---|
| JP | 2019-179457 A | 10/2019 |
| JP | 2019-192082 A | 10/2019 |
| WO | 2018/142764 A1 | 8/2018 |

OTHER PUBLICATIONS

Koh, et al., "Understanding Black-box Predictions via Influence Functions", International Conference on Machine Learning, Dec. 29, 2020, 12 pages.
Cook, et al., "Residuals and Influence in Regression", Chapman and Hall, New York, 1982, 240 pages.
Selvaraju, et al., "Grad-CAM: Visual Explanations from Deep Networks via Gradient-based Localization" Computer Vision and Pattern Recognition, Dec. 3, 2019, 23 pages.
Ribeiro, et al., "Why Should I Trust You?" Explaining the Predictions of Any Classifier, Machine Learning, Aug. 9, 2016, 10 pages.

* cited by examiner

| DATASET ID | DATA ID | DATA | ATTRIBUTE #1 | ATTRIBUTE #2 | ... |
|---|---|---|---|---|---|
| DS1 | DID1 | DT1 | ADULT | MALE | ... |
| | DID2 | DT2 | CHILD | FEMALE | ... |
| | DID3 | DT3 | ADULT | FEMALE | ... |
| | DID4 | DT4 | ADULT | FEMALE | ... |
| | DID5 | DT5 | ADULT | MALE | ... |
| | DID6 | DT6 | ADULT | MALE | ... |
| | DID7 | DT7 | ADULT | FEMALE | ... |
| | DID8 | DT8 | ADULT | MALE | ... |
| | ... | ... | ... | ... | ... |
| ... | ... | ... | ... | ... | ... |

| MODEL ID | APPLICATION | MODEL DATA | ... |
|---|---|---|---|
| M1 | IMAGE RECOGNITION | MDT1 | ... |
| ... | ... | ... | ... |

123

| MINORITY ATTRIBUTE | PROPORTION | ... |
|---|---|---|
| CHILD | 0.02 | ... |
| ... | ... | ... |

141

| CONDITION ID | COLLECTION CONDITION INFORMATION | ... |
|---|---|---|
| CD1 | INF1 | ... |
| ... | ... | ... |

START

S101

TRANSMIT REQUEST SIGNAL FOR
REQUESTING DATA TO SENSOR DEVICE

S102

RECEIVE DATA CORRESPONDING TO
REQUEST FROM SENSOR DEVICE

END

START

S201

RECEIVE REQUEST SIGNAL FOR
REQUESTING DATA

S202

TRANSMIT COLLECTED DATA TO
SERVER DEVICE

END

DATA COLLECTION SYSTEM, SENSOR DEVICE, DATA COLLECTION DEVICE, AND DATA COLLECTION METHOD

CROSS REFERENCE TO RELATED APPLICATIONS

This application is a U.S. National Phase of International Patent Application No. PCT/JP2021/023319 filed on Jun. 21, 2021, which claims priority benefit of Japanese Patent Application No. JP 2020-117369 filed in the Japan Patent Office on Jul. 7, 2020. Each of the above-referenced applications is hereby incorporated herein by reference in its entirety.

FIELD

The present disclosure relates to a data collection system, a sensor device, a data collection device, and a data collection method.

BACKGROUND

In various technical fields, information processing using machine learning (also simply referred to as "learning or training") such as deep learning has been utilized, and techniques of training a model such as a neural network have been provided. In such learning, data used for the learning has an influence on the performance of a model or the like of a neural network or the like to be trained. This increases the importance of the data used for learning, leading to provision of technologies related to data used for learning is provided (refer to Patent Literature 1, for example).

CITATION LIST

Patent Literature

Patent Literature 1: JP 2019-179457 A

SUMMARY

Technical Problem

According to the known technology, learning is performed using data obtained by complementing a missing value from a candidate value.

However, the known technology cannot always perform learning using appropriate data. For example, in a case where the known technology uses data that is not suitable for learning, the data is used as it is, leading to a failure in training a model such as a neural network having desired performance in some cases. This leads to the need for collecting desired data used for learning.

In view of this, the present disclosure proposes a data collection system, a sensor device, a data collection device, and a data collection method capable of collecting desired data used for machine learning.

Solution to Problem

According to the present disclosure, a data collection system includes a sensor device that collects data; and a server device including: a learning model that performs output according to a learning result, corresponding to input; and a data analysis unit that specifies data that is beneficial for or lacking in training of the learning model, wherein the server device transmits, to the sensor device, a request signal for collecting data that is beneficial for or lacking in the training specified by the data analysis unit, or data similar to the data, the sensor device collects data that is beneficial for or lacking in the training, or similar data based on the received request signal, and transmits the collected data to the server device, and the server device retrains the learning model based on the data transmitted from the sensor device.

BRIEF DESCRIPTION OF DRAWINGS

FIG. 4 is a diagram illustrating an example of a data information storage unit according to the embodiment of the present disclosure.

FIG. 5 is a diagram illustrating an example of a model information storage unit according to the embodiment of the present disclosure.

DESCRIPTION OF EMBODIMENTS

Embodiments of the present disclosure will be described below in detail with reference to the drawings. Note that the data collection system, the sensor device, the data collection device, and the data collection method according to the present application are not limited by the embodiment. Moreover, in each of the following embodiments, the same parts are denoted by the same reference symbols, and a repetitive description thereof will be omitted.

The present disclosure will be described in the following order.

1. Embodiments
  1-1. Outline of data collection processing according to embodiment of present disclosure
    1-1-1. Data collection (consent, Judgment criteria, etc.)
    1-1-2. Acquisition of minority attribute data
    1-1-3. Influence function
    1-1-4. Visualization of judgment (Grad-CAM, LIME, etc.)
  1-2. Configuration of data collection system according to embodiment
  1-3. Configuration of data collection device according to embodiment
    1-3-1. Model (network) examples
  1-4. Configuration of sensor device according to embodiment
  1-5. Procedure of information processing according to embodiment
    1-5-1. Procedure of processing related to data collection device
    1-5-2. Procedure of processing related to sensor device
    1-5-3. Procedure of processing related to data collection system
  1-6. Example of data collection and training process of minority attribute
  1-7. Displaying judgment basis, etc.
2. Other embodiments
  2-1. Other configuration examples
  2-2. Data
  2-3. Others
3. Effects according to present disclosure
4. Hardware configuration

1. EMBODIMENTS

[1-1. Outline of Data Collection Processing According to Embodiment of Present Disclosure]

Figure 1:
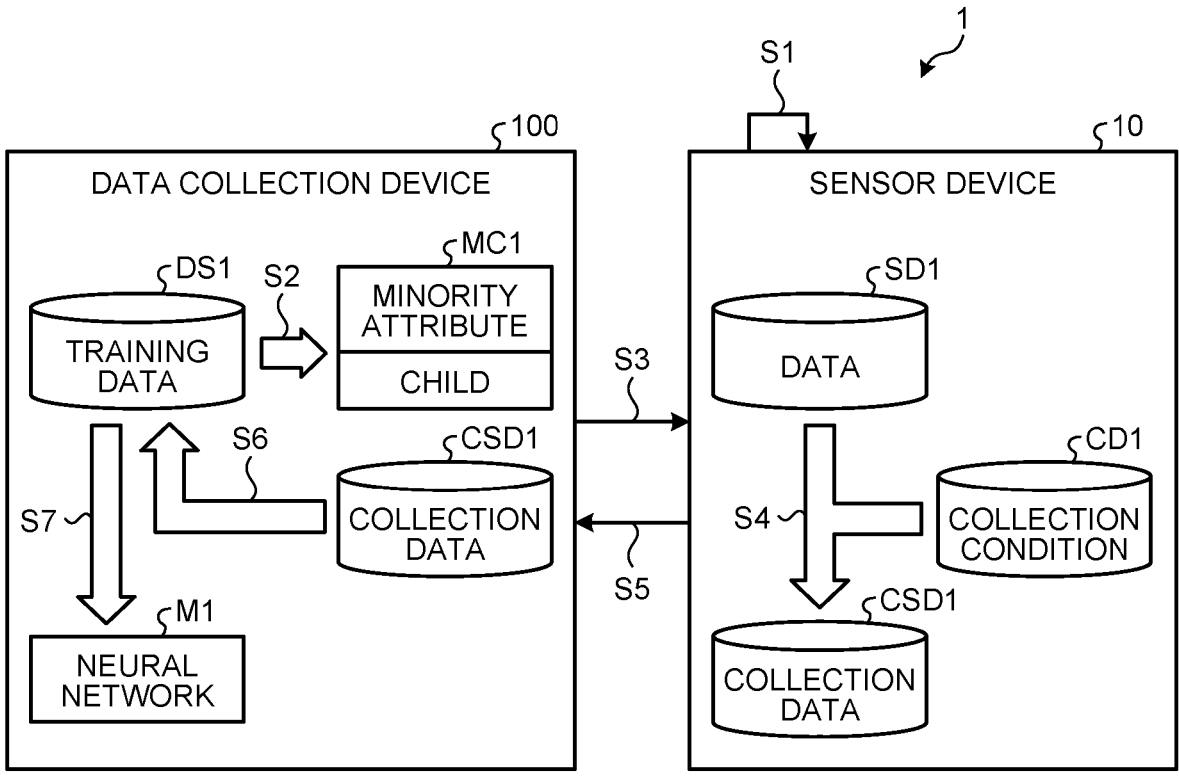
FIG. 1 is a diagram illustrating an example of data collection processing according to an embodiment of the present disclosure.

FIG. 1 is a diagram illustrating an example of data collection processing according to an embodiment of the present disclosure. The data collection processing according to the embodiment of the present disclosure is implemented by a data collection system 1 including a data collection device 100 and a sensor device 10. With FIG. 1, an outline of data collection processing implemented by the data collection system 1 will be described. FIG. 1 is a diagram illustrating an example of data collection processing according to an embodiment of the present disclosure.

The data collection device 100 is a server device that specifies data having a beneficial effect or influence on learning in training data (hereinafter also referred to as "retained data") used for machine learning by using Explainable AI (XAI) or Influence function and that requests the sensor device 10 for the specified data, data lacking in the retained data, or data similar to at least one of these pieces of data. The data collection device 100 then acquires data corresponding to the request from the sensor device 10 to collect data used for machine learning. FIG. 1 illustrates an exemplary case where the data collection device 100 adds data acquired from the sensor device 10 to data (hereinafter, also referred to as "training data") used for training a deep neural network (DNN). The data collection device 100 executes a training process of performing deep learning using training data on a discriminative model (hereinafter, also simply referred to as a "model") that is a DNN for performing image recognition. Hereinafter, the deep neural network (DNN) will be simply referred to as a neural network (NN) in some cases.

Furthermore, FIG. 1 illustrates a camera that captures an image, as an example of the sensor device 10. Note that the sensor device 10 is not limited to a camera and may be various devices as long as data requested by the data collection device 100 can be collected by a sensor and provided to the data collection device 100. For example, the sensor device 10 may be a mobile body such as a mobile robot, an unmanned aerial vehicle (UAV) such as a drone, or a vehicle such as an automobile, an image sensor (imager), an earphone, a wearable terminal (wearable device) such as augmented reality (AR) eyeglasses, or a home appliance such as a television, a mobile phone, a refrigerator, or an air conditioner, and the details of which will be described below.

An outline of the processing illustrated in FIG. 1 will be described below. First, the sensor device 10 acquires data by sensing (detecting) a sensor unit 16 (refer to FIG. 8) (step S1). In the example of FIG. 1, the sensor device 10 captures an image by an image sensor 161 (refer to FIG. 8), and retains the captured image as data SD1. The data SD1 is stored in a data storage unit 142 (refer to FIG. 8). Incidentally, the sensor device 10 may capture an image corresponding to the request, in response to the request from the data collection device 100, which will be described below.

The data collection device 100 specifies data to be requested to the sensor device 10 based on the training data DS1 used for machine learning (step S2). The training data DS1 is stored in a data information storage unit 121 (refer to FIG. 4). In FIG. 1, the training data DS1 is assumed to include a large number of captured images of adults (for example, 98% of the whole) and a small number of captured images of children (for example, 2% of the whole). In this manner, in FIG. 1, the data corresponding to the attribute "child" included in the training data DS1 is less than the data corresponding to the other attribute "adult". Hereinafter, an attribute with less corresponding data, such as the attribute "child" in FIG. 1, will be described as "minority attribute" in some cases. For example, the data collection device 100 may compare a proportion of data corresponding to each attribute with a predetermined threshold (for example, 0.1 (10%), 0.05 (5%), or the like) and determine the attribute less than the predetermined threshold as a minority attribute.

The data collection device 100 specifies data to be requested from the sensor device 10 according to the imbalance of the data configuration included in the training data DS1. The data collection device 100 specifies data corresponding to the minority attribute as data to be requested from the sensor device 10. In the example of FIG. 1, as illustrated in request information MC1, the data collection device 100 specifies an image corresponding to the minority attribute "child" as an image to be requested from the sensor device 10. While the example of FIG. 1 is a case of specifying data lacking in retained data, data specified as data having a beneficial effect or influence on learning may be requested using XAI or an influence function. Details of XAI, an influence function, and the like will be described below.

Subsequently, the data collection device 100 requests data from the sensor device 10 (step S3). The data collection device 100 transmits the request information MC1 to the sensor device 10 to request the sensor device 10 for an image corresponding to the minority attribute "child". The data collection device 100 may transmit information indicating the number of pieces of required data (hereinafter also referred to as "number of requests"). For example, the data collection device 100 may transmit information indicating the number of necessary images (the number of requests) corresponding to the minority attribute "child".

The sensor device 10 that has received the request from the data collection device 100 generates collection data CSD1 corresponding to the request information (step S4). The sensor device 10 generates the collection data CSD1 using the data SD1 and a collection condition CD1. The collection condition CD1 includes a data collection criterion indicating that pixelation is performed on a face of a person (subject) in the image in consideration of privacy of the person (subject). The collection condition CD1 is not limited to the collection criterion described above, and may include a condition related to consent of a person (subject) in the image or a judgment criterion of a location (country, administrative district, or the like) of imaging, which will be described below. The judgment criterion here is a concept including various factors to be a basis of (value) judgment at the location, such as rules (laws, ordinance, and the like), regulations, ethics, and the like at the location, for example. Furthermore, the administrative district herein may be any district as long as it has authority to establish rules such as ordinance, and including prefectures, municipalities, for example, in the case of Japan.

The sensor device 10 extracts an image including a person corresponding to the minority attribute "child" from the data SD1, as a target image. For example, the sensor device 10 estimates whether a child is included in an image by an object recognition technique such as general object recognition, and extracts an image estimated to include a child, as a target image. Furthermore, the sensor device 10 may extract the target image corresponding to the minority attribute "child" using meta-information indicating an attribute associated with each image in the data SD1.

Subsequently, the sensor device 10 applies pixelation on the face of the person in each extracted target image. Note that the pixelation described herein is not limited to processing of applying pixelation processing on a human face region in an image, and may be any processing as long as it is processing that makes it difficult to identify an individual by a human face. For example, pixelation includes editing to reduce the resolution of a human face region in the image. For example, the sensor device 10 specifies a region including a face of a person from an image by a face recognition technique or the like based on artificial intelligence or a machine learning model, and applies image processing such as appropriate pixelation to the specified region, thereby generating edited image data in which pixelation has been applied to a face of a person. With this processing, the sensor device 10 generates the collection data CSD1 including an edited image group including an image of a child and in which the face of the child is pixelated.

When there are a small number of pieces of data corresponding to the request, the sensor device 10 may perform sensing of the data corresponding to the request. For example, in a case where the number of target images corresponding to the minority attribute "child" in the data SD1 is less than a predetermined number (for example, the number of requests or the like), the sensor device 10 may capture an image of a person corresponding to the minority attribute "child" so as to acquire images corresponding to the minority attribute "child" until the number of requests reaches the required number. Note that regulations and ethics differ depending on the country or region of imaging, for example, and thus, the artificial intelligence, the machine learning model, or an agent obtains consent from an appropriate partner when imaging the child. For example, such an artificial intelligence and machine learning model can discriminate whether data collected by the sensor device is illegal or legitimate by using the trained model by periodically collecting laws, precedents, regulations, or guidelines of each country and each region and learning what type of data is legitimate or illegal.

Subsequently, the sensor device 10 provides the collection data CSD1 to the data collection device 100 (step S5). The sensor device 10 transmits the collection data CSD1 including the edited image group, in which the face of the child is pixelated, to the data collection device 100.

The data collection device 100 that has acquired the collection data CSD1 from the sensor device 10 adds the acquired provision data to the training data DS1 (step S6). With this operation, the data collection device 100 adds an image corresponding to the minority attribute "child" to the training data DS1. With this configuration, the data collection device 100 can use, for the learning, the training data DS1 to which the image corresponding to the minority attribute "child" has been added and in which the imbalance of the data configuration has been improved.

Subsequently, by using the training data DS1 the data collection device 100 trains the model M1, which is a neural network (step S7). For example, the data collection device 100 trains the model M1 by using training data DS1 in which each image is associated with a ground truth label indicating an object included in the image. For example, the data collection device 100 uses the training data DS1 to perform a training process so as to minimize a set loss function, thereby training the model M1. Note that the above is an example, and the data collection device 100 may perform the training process on the model M1 by various methods.

As described above, by specifying lacking data or data having a beneficial effect or influence in machine learning and requesting the specified data from the sensor device 10, the data collection device 100 can collect desired data used for the learning. In addition, the data collection device 100 requests the sensor device 10 for data with a minority attribute and collects the data with the minority attributes, making it possible to improve the imbalance of the data configuration.

In addition, by providing data satisfying the collection condition when providing data to the data collection device 100, the sensor device 10 can collect desired data used for learning while satisfying the condition related to data collection. In the example of FIG. 1, by editing the face of the person in consideration of the privacy of the person, the sensor device 10 can collect desired data used for learning while considering privacy of the captured person (child).

[1-1-1. Data Collection (Consent, Judgment Criteria, Etc.)]

Although the case of FIG. 1 is an exemplary case where the data is collected by editing the face of the person using the collection criterion related to privacy such as the face of the person as the collection condition, the collection condition may be various conditions, not limited to the above. For example, the data collection system 1 may use or set in advance, by artificial intelligence or machine learning, a collection condition related to a consent of a subject (person) being a data collection target by the sensor, or an owner of the data, or a rule (law, ordinance, or the like) of the region (country, administrative district, or the like) where sensing is performed by the sensor. This point will be described below.

The data collection system 1 may use the presence or absence of consent of a person included in the image as a collection condition. For example, the data collection system 1 may set, as the collection condition, that there is no need to edit the face of a person in a case where there is a consent of the person included in the image or a consent has been obtained by an agent function or the like. In this case, the sensor device 10 may determine that an image, when having a consent of the person in the image, satisfies the collection condition and transmit the image to the data collection device 100 without editing the image.

In addition, the data collection system 1 may use collection conditions based on rules (laws, ordinance, or the like) of the region (country, administrative district, or the like) where data is collected by the sensor device 10. For example, the data collection system 1 may use a collection condition based on a rule related to privacy of the region where sensing is performed by the sensor device 10. For example, in a case where a country in which the sensor device 10 perform data collection prohibits use of an image including a human face, the data collection system 1 may use editing of human faces as a collection condition. In this case, the sensor device 10 may apply pixelation on the face or change the face to another person and transmit the image to the data collection device 100.

The collection conditions based on rules such as laws and ordinance (including General Data Protection Regulation (GDPR)) may be set by an administrator or the like of the data collection system 1, or may be automatically set by the data collection system 1 by analyzing the target rule. When the administrator or the like of the data collection system 1 sets the collection conditions based on rules such as laws and ordinances, the administrator or the like may designate the collection conditions based on the rules and transmit the designated collection conditions from the data collection device 100 to the sensor device 10. The sensor device 10 that has received the collection condition stores the received collection condition in a collection condition storage unit 141, and provides data to the data collection device 100 using the collection condition.

In addition, in a case of analyzing or learning a rule and automatically setting the rule, the data collection system 1 may analyze or learn laws, ordinance, or the like of a country, an administrative district, or the like using, for example, artificial intelligence, a machine learning model, or a natural language processing technology, and may set or change the collection condition based on an analysis/learning result. For example, by syntactically analyzing character information of laws, regulations, and the like and analyzing or learning the character information by appropriately using various conventional technologies such as AI, the data collection device 100 may estimate the contents of laws, ordinance, or the like, and provide the sensor device 10 with a collection condition specified based on the estimation result.

For example, when having estimated that there is a need to protect personal information based on the contents of laws, ordinance, or the like, the data collection device 100 transmits a collection condition including prohibition of specifying an individual to the sensor device 10. When having estimated that a person's face needs to be edited based on the contents of laws, ordinance, and the like, the data collection device 100 transmits a collection condition including editing of a person's face to the sensor device 10. Note that the above is an example, and the data collection system 1 sets collection conditions by appropriately using various types of information.

The data collection device 100 may conduct learning of a judgment criterion such as rules (laws, ordinance, or the like), regulations, and ethics of a location where data is collected, and make a judgment based on the learning result.

For example, the data collection device 100 may collect data such as rules, regulations, and ethics in each country, and may train the judgment criterion model based on the data. For example, the data collection device 100 may collect authorized data judged to be authorized, together with unauthorized data judged to be unauthorized, according to a judgment criterion such as rules (laws, ordinance, or the like), regulations, or ethics of each country, and may train the judgment criterion model based on these pieces of data. For example, the data collection device 100 may train the judgment criterion model so as to output "1" when the authorized data is input and output "0" when the unauthorized data is input. In this case, the data collection device 100 may judge the authorization of each data by using the judgment criterion model. The data collection device 100 may input target data to the judgment criterion model, judge that the target data is authorized to be used as it is when the value output from the judgment criterion model is a predetermined threshold or more, and use the target data as it is as training data. In addition, the data collection device 100 may input the target data to the judgment criterion model, and judge that the target data is unauthorized as a whole when the value output from the judgment criterion model is less than a predetermined threshold, and then may edit the target data or exclude the target data from the data used for learning. Note that the above is an example, and the data collection device 100 may make various judgments based on judgment criteria such as rules, regulations, and ethics.

Furthermore, although the above example, is a case where the sensor device 10 edits data, data editing may be performed by the data collection device 100. For example, the data collection device 100 may change the face of a person in the image to the face of another person. In addition, for example, the data collection system 1 may use a data collection criterion of not requiring editing of a human face, as a collection condition. In this case, the sensor device 10 may determine that the image satisfies the collection condition and transmit the image to the data collection device 100 without editing the image.

Furthermore, as described above, the sensor device 10 may collect data corresponding to the attribute requested by the data collection device 100. The sensor device 10 may capture an image including a person (also referred to as "corresponding person") corresponding to the minority attribute "child" requested by the data collection device 100. Additionally, when there is no consent of the corresponding person, the sensor device 10 may edit the face of the corresponding person in the image and transmit the edited image to the data collection device 100.

[1-1-2. Acquisition of Minority Attribute Data]

Here, acquisition of minority attribute data illustrated as an example in FIG. 1 will be described. In person/object recognition, a low recognition rate of a minority data attribute has a possibility of impairing fairness. For example, occasions where the number of pieces of data is small, such as a case including not easily recognizable skin color or a small person such as a child would lead to occurrence of unfairness that the recognition rate in the person/object recognition is lower than that of the majority data attributes. In practice, it would be an undesirable condition as AI ethics, having a possibility of causing a disadvantageous result for the minority data attribute.

This leads to the usefulness of a system that actively collects minority attribute data, such as the data collection system 1 illustrated in FIG. 1. The majority attribute data exist sufficiently, and has a possibility of occurrence of a case where data bias occurs due to imbalance. To handle this, the data collection system 1 can reduce the burden on the entire system by acquiring only the minority attribute data. For example, in a case where data of a child is insufficient in application of the data collection system 1 to an in-vehicle system, there is a possibility of occurrence of a problem in automatic driving, that is, a poor recognition rate for a child, who is not tall. A camera (for example, the sensor device 10) of the in-vehicle system determines a child and actively collects data correspondingly. This data collection eliminates data imbalance. The training of the deep learning for automatic driving is performed again by the dataset in which child data is replenished and the data bias is relaxed. Thereafter, occurrence of data bias is checked. The bias check can also be performed by measuring the recognition rate of the minority data, but this point will be described with FIG. 13.

[1-1-3. Influence Function]

Although the example described above is a case of specifying lacking data and requesting the specified data, it is also allowable to specify data having a beneficial effect or influence on learning using XAI, an influence function, or the like, and request the specified data or similar data. In the following, an influence function will be described as an example of a method of specifying data having a beneficial effect or influence. Alternatively, data having a beneficial effect or influence may be specified using XAI such as Grad-CAM or LIME to be described below.

By using the influence function, the data collection device 100 quantitatively analyzes the influence of each data in the dataset on the model (parameter) to be generated. For example, using the influence function, the data collection device 100 formulates the influence of the presence or absence of certain (training) data on the accuracy (output result) of the model. For example, the data collection device 100 measures the degree of influence of each data on learning without retraining using a dataset excluding each data to be measured for influence. Subsequently, the data collection device 100 specifies data having a beneficial effect or influence based on the measured degree of influence of each data. The data collection device 100 specifies data the measured degree of influence of which satisfies a predetermined condition, as data having a beneficial effect or influence. For example, the data collection device 100 specifies data having a measured degree of influence of a predetermined threshold or more as data having a beneficial effect or influence.

Hereinafter, the measurement of the degree of influence using the influence function will be described using a mathematical expression or the like. The influence function is also used as a method of explaining a black box model of machine learning, for example. The influence function is disclosed in the literature such as the following literature.

> Understanding Black-box Predictions via Influence Functions, Pang Wei Kho and Percy Liang <https://arxiv.org/abs/1703.04730>

By using the influence function, the data collection device 100 can calculate the degree of contribution of data to machine learning, and can measure (grasp) how much favorable influence or unfavorable influence a certain data has. For example, the data collection device 100 calculates (measures) the degree of influence by an algorithm, data, or the like as described below. Hereinafter, a case where an image is used as input data will be described as an example.

For example, the case will be treated as a prediction problem in machine learning using an input x (image) and an output y (label). Each image is labeled, that is, an image and a ground truth label are associated with each other. For example, when there are n (n is an optional natural number) sets (datasets) of images and labels, each labeled image z (simply described as "image z" in some cases) is expressed as in the following formula (1).

$$z_1, z_2, \ldots, z_n z_i = (x_i, y_i) \in X \times Y \tag{1}$$

Here, when a loss at a parameter $\theta \in \Theta$ of the model at a certain point z (image z) is $L(z, \theta)$, the empirical risk in all n pieces of data can be expressed as the following Formula (2).

$$\frac{1}{n} \sum_{i=1}^{n} L(z_i, \theta) \tag{2}$$

The minimization of the empirical risk is to find (determine) a parameter that minimizes the risk, and thus can be expressed as the following Formula (3).

$$\hat{\theta} \equiv \operatorname{argmin}_{\theta \in \Theta} \frac{1}{n} \sum_{i=1}^{n} L(z_i, \theta) \tag{3}$$

For example, the data collection device 100 calculates a parameter (the left side of Formula (3)) that minimizes the risk using Formula (3). Here, it is assumed that the empirical risk is twice-differentiable and is a convex function with respect to the parameter $\theta$. The following will describe how to perform calculation with the aim of understanding the degree of influence of data, being a training point of the machine learning model. When there is no data of a certain training point, how this fact has an influence on the machine learning model will be discussed.

Note that a parameter (variable) having a hat "^" above a certain character, such as a parameter (variable) having a hat "^" above "$\theta$" ($\theta$ hat) on the left side of Formula (3), indicates a predicted value, for example. Hereinafter, when referring to the parameter (variable) having a hat "^" on "0" on the left side of Formula (3) in the sentence, the parameter is expressed as "$\theta$^" which describes "^" following "0". A case where a certain training point z (image z) has been removed from the machine learning model can be expressed as the following Formula (4).

$$\hat{\theta}_{-z} \equiv \operatorname{argmin}_{\theta \in \Theta} \frac{1}{n} \sum_{z_i \neq z} L(z_i, \theta) \tag{4}$$

For example, the data collection device 100 calculates a parameter (the left side of Formula (4)) in a case where learning is performed using Formula (4) without using certain training data (image z). For example, the degree of influence is a difference between the case where the training point z (image z) has been removed and when the case where all data points exist including the training point z. This difference is expressed by the following expression (5).

$$\hat{\theta}_{-z} - \hat{\theta} \tag{5}$$

Here, performing recalculation for a case where the image z is removed would result in high calculation cost. Therefore, using the influence function, the data collection device 100 performs calculation without recalculating (retraining) the case where the image z is removed, by using effective approximation as described below.

This concept is a method of calculating a change in a parameter assuming that the image z is weighted by minute ε. Here, a new parameter (the left side of Formula (6)) is defined using the following Formula (6).

$$\hat{\theta}_{\epsilon,z} \equiv \mathrm{argmin}_{\theta \in \Theta} \frac{1}{n} \sum_{i=1}^{n} L(z_i, \theta) + \epsilon L(z, \theta) \tag{6}$$

By utilizing the results of prior studies by Cook and Weisberg in 1982, the degree of influence of the weighted image z with the parameter θ^ (left side of Formula (3)) can be expressed as the following Formulas (7) and (8).

$$I_{up,params}(z) \equiv \left. \frac{d\hat{\theta}_{\epsilon,z}}{d\epsilon} \right|_{\epsilon=0} = -H_{\hat{\theta}}^{-1} \nabla_\theta L(z, \hat{\theta}) \tag{7}$$

$$H_{\hat{\theta}} \equiv \frac{1}{n} \sum_{i=1}^{n} \nabla_\theta^2 L(z_i, \hat{\theta}) \tag{8}$$

The prior studies by Cook and Weisberg are disclosed in the following literature, for example.

Residuals and Influence in Regression, Cook, R. D. and Weisberg, S<https://conservancy.umn.edu/handle/11299/37076>

For example, Formula (7) represents an influence function corresponding to a certain image z. For example, Formula (7) represents a change amount of a parameter with respect to minute ε. In addition, Formula (8) represents Hessian matrix (or Hessian), for example. Here, the matrix is assumed to be a Hessian matrix having a positive definite value, and an inverse matrix also exists. Assuming that removing the data point z (image z), which is a certain point, is the same as being weighted by "ε=−1/n", the parameter change when the image z has been removed can be approximately expressed by the following Formula (9).

$$\hat{\theta}_{-z} - \hat{\theta} \approx -\frac{1}{n} I_{up,params}(z) \tag{9}$$

That is, the data collection device 100 can measure (obtain) the degree of influence when the data point z (image z) has been removed, without performing retraining.

Next, the data collection device 100 measures (obtains) the degree of influence on the loss at a certain test point $z_{test}$ using the following Formulas (10-1) to (10-3).

$$I_{up,loss}(z, z_{test}) \equiv \left. \frac{dL(z_{test}, \hat{\theta}_{\epsilon,z})}{d\epsilon} \right|_{\epsilon=0} \tag{10-1}$$

$$= \nabla_\theta L(z_{test}, \hat{\theta})^T \left. \frac{d\hat{\theta}_{\epsilon,z}}{d\epsilon} \right|_{\epsilon=0} \tag{10-2}$$

$$= -\nabla_\theta L(z_{test}, \hat{\theta})^T H_{\hat{\theta}}^{-1} \nabla_\theta L(z, \hat{\theta}) \tag{10-3}$$

In this manner, the degree of influence of the weighted image z at the certain test point $z_{test}$ can be formulated. Therefore, this calculation makes it possible for the data collection device 100 to measure (obtain) the degree of influence of data in the machine learning model. For example, the right side of Formula (10-3) includes a gradient with respect to loss of certain data, an inverse matrix of Hessian, a gradient of loss of certain training data, and the like. For example, the influence of certain data on the prediction (loss) of the model can be obtained by Formula (10-3). The above is an example, and the data collection device 100 may appropriately execute various calculations and measure the degree of influence of each image on the learning.

In addition, the data collection device 100 may calculate a quantitative score also for Grad-CAM or LIME described below and specify data having a beneficial effect or influence based on the calculated score. For example, the data collection device 100 may specify data in which a region indicating a feature of a heatmap generated by the Grad-CAM is a predetermined threshold or more, as data having a beneficial effect or influence. For example, the data collection device 100 may specify data in which an output of the basis model generated by LIME is a predetermined threshold or more, as data having a beneficial effect or influence. Note that the above is an example, and data having a beneficial effect or influence on learning may be specified by any method as long as the data having a beneficial effect or influence can be specified using XAI, influence function, or the like.

[1-1-4. Visualization of Judgment (Grad-CAM, LIME, Etc.)]

Furthermore, by using an algorithm referred to as Explainable AI (XAI) such as Gradient-weighted Class Activation Mapping (Grad-CAM) and Local Interpretable Model-agnostic Explanations (LIME), it is possible to give a human a knowledge of a judgment basis of deep learning. Therefore, the data collection system 1 may visualize the basis regarding the output (judgment) of the model by appropriately using a method such as Grad-CAM or LIME. This allows the user of the data collection system 1 to know whether the recognition of the child is correctly performed. Hereinafter, an example of visualization using Grad-CAM, LIME, or the like will be briefly described.

First, Grad-CAM will be described. For example, using Grad-CAM, the data collection system 1 generates basis information visualizing the basis regarding the output (judgment) of the model after the input of an image. The data collection system 1 generates, by the Grad-CAM, basis information indicating the basis on which the model M1 that recognizes an image has judged the presence or absence of a person. For example, the data collection system 1 generates basis information by processing related to Grad-CAM as disclosed in the following literature. The data collection system 1 generates basis information indicating the basis regarding the output of the model M1 using the technology of Grad-CAM, which is a visualization method applicable to all networks including CNN. For example, the data collection system 1 can visualize a portion having an influence on each class by calculating a weight of each channel from the final layer of the CNN and multiplying the weight. In this manner, the data collection system 1 can visualize which part of the image is focused in a judgment by the neural network including the CNN.

Grad-CAM: Visual Explanations from Deep Networks via Gradient-based Localization <https://arxiv.org/abs/1610.02391>

The data collection system 1 generates the basis information by the method of the Grad-CAM (refer to the above literature), although technical details of the Grad-CAM are appropriately omitted. For example, the data collection system 1 designates a target type (class) and generates information (image) corresponding to the designated class. For example, the data collection system 1 generates information (images) targeted for a designated class by using the technology of Grad-CAM, specifically, by various types of processing such as backpropagation. For example, a data collection system 1 designates the class of the type "child", and generates an image related to the basis information corresponding to the type "child". For example, the data collection system 1 generates an image including a range (region) of interest for recognition (classification) of the type "child" indicated by a form referred to as heatmap (color map) form.

In addition, the data collection system 1 stores data (image) to be input and basis information indicating the basis of the judgment result in association with each other in a storage unit 120 (refer to FIG. 3) as a log (history). With this operation, it is possible to verify the type of input on which the data collection system 1 has made a judgment and performed the subsequent operation. In addition, for example, the data collection system 1 may use logs of data (images) to be used as an input stored in the storage unit 120 and basis information indicating the basis of the judgment result, for various types of processing. For example, the data collection system 1 may generate data by using a log of input data (image) and basis information indicating the basis of the judgment result. For example, the data collection system 1 may generate an image changed from the input image so as to include the image of the region indicated as the basis by the heatmap, being the basis information. Note that the above is an example, and the data collection system 1 may generate data from a log by appropriately using various methods.

In addition, the data collection system 1 may generate the basis information by a method such as LIME. For example, the data collection system 1 may generate the basis information by processing related to LIME as disclosed in the following literature.

"Why Should I Trust You?": Explaining the Predictions of Any Classifier <https://arxiv.org/abs/1602.04938>

The data collection system 1 generates the basis information by the method of the LIME (refer to the above literature), although technical details of the LIME are appropriately omitted. For example, the data collection system 1 generates another model (basis model) that is locally approximated to indicate a reason (basis) for the judgment the model has made. The data collection system 1 generates a locally approximate basis model targeted for a combination of input information and an output result corresponding to the input information. Subsequently, the data collection system 1 generates basis information by using the basis model.

For example, the data collection system 1 generates a plurality of pieces of input information obtained by duplicating or changing input information (target input information) being a basis of an image or the like. Subsequently, the data collection system 1 inputs each of a plurality of pieces of input information to a model (explanation target model) to be a generation target of the basis information, and causes the explanation target model to output a plurality of pieces of output information corresponding to each piece of the input information. Subsequently, the data collection system 1 trains the basis model by using a combination (pair) of each of the plurality of pieces of input information and each of the plurality of pieces of corresponding output information as training data. In this manner, the data collection system 1 generates the basis model that locally approximates the target input information with another interpretable model (such as a linear model) as a target.

Figure 14:
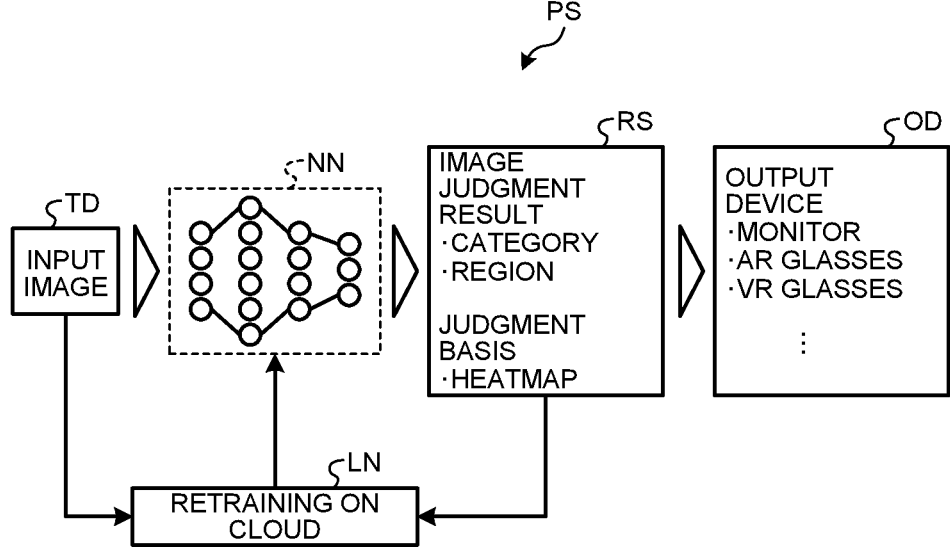
FIG. 14 is a conceptual diagram of processing including visualization of judgment.

Hereinafter, processing including visualization of judgment will be described with reference to FIG. 14. FIG. 14 is a conceptual diagram of processing including visualization of judgment. Processing PS in FIG. 14 is illustrated as an overall conceptual diagram of processing including visualization of judgment implemented by the data collection system 1. The processing described as being a subject of processing by the data collection system 1 may be performed by any device included in the data collection system 1, such as the data collection device 100 and the sensor device 10.

First, an overall processing outline of the processing PS in FIG. 14 will be described. In the processing PS by the data collection system 1, an input image TD is input to a trained model NN as indicated by an input IN in FIG. 14. The data collection system 1 displays an image judgment result visualized by the above-described visualization techniques such as Grad-CAM and LIME, as well as judgment basis information RS such as a heatmap being its judgment basis, on an output device OD. Examples of the output device OD include a monitor, AR glasses, and virtual reality (VR) glasses. The output device OD may be integrated with the sensor device 10. With this configuration, the data collection system 1 allows a human to visually confirm the judgment result and the basis in real time.

Subsequently, in the processing PS performed by the data collection system 1, as illustrated in a training process LN in FIG. 14, the input image TD and the judgment basis information RS are transmitted to a cloud center (the data collection device 100), and retraining is performed, so as to achieve improved recognition accuracy of the deep learning recognizer (model). Subsequently, the data collection system 1 distributes the retrained model to an edge (for example, the output device OD or the sensor device 10) to update the model on the edge.

Although one neural network NN is illustrated in the example of FIG. 14, there may be two second deep learning recognizers (neural networks), namely, a first deep learning recognizer that recognizes a human face or body and a second deep learning recognizer for general object recognition.

In this case, the input image TD is first input to the first deep learning recognizer that recognizes a human face or body. When the result is a person, the image judgment result and its judgment basis are displayed as a heatmap. When the result is an object other than a person, the object is judged by the second deep learning recognizer for general object recognition, and the result and its judgment basis are similarly displayed. Since a person and an object sometimes appear simultaneously in one image, both images go through the object recognizer. Also in this case, the output device OD allows a human to visually confirm the judgment result and the basis in real time.

[1-2. Configuration of Data Collection System According to Embodiment]

Figure 2:
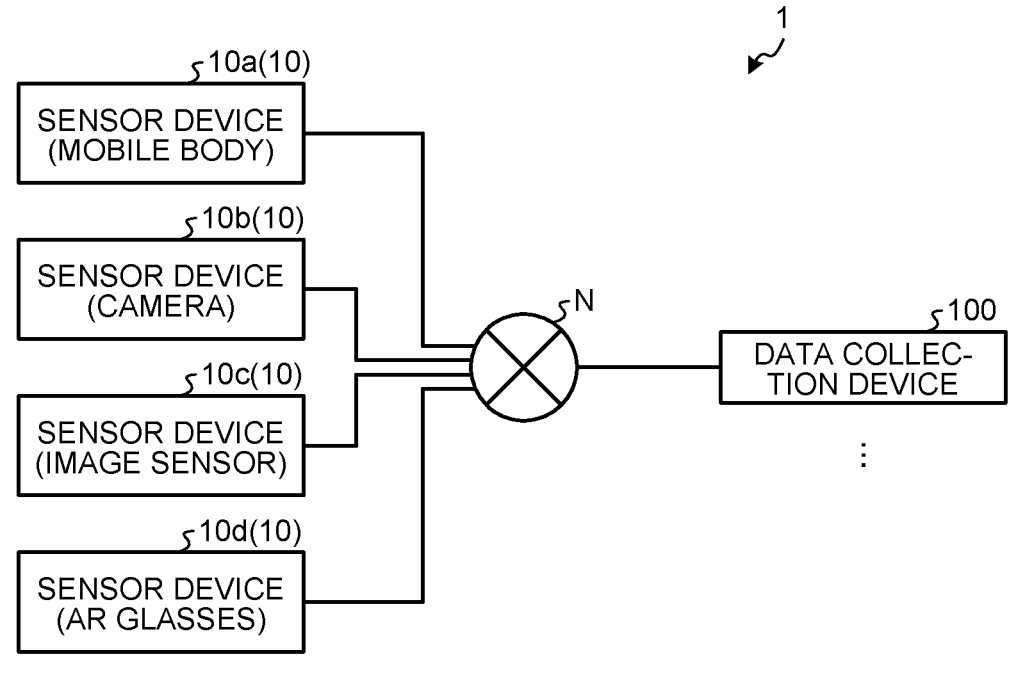
FIG. 2 is a diagram illustrating a configuration example of the data collection system according to the embodiment of the present disclosure.

The data collection system 1 illustrated in FIG. 2 will be described. The data collection system 1 is an information processing system that implements adjustment processing of adjusting training data. As illustrated in FIG. 2, the data collection system 1 includes a data collection device 100 and a plurality of sensor devices 10a, 10b, 10c, and 10d. When the sensor devices 10a, 10b, 10c, 10d, and the like are not distinguished from each other, they may be referred to as sensor devices 10. Although four sensor devices 10a, 10b, 10c, and 10d are illustrated in FIG. 2, the data collection system 1 may include more than four (for example, 20 or 100 or more) sensor devices 10. The sensor device 10 and the data collection device 100 are communicably connected in a wired or wireless channel via a predetermined communication network (network N). FIG. 2 is a diagram illustrating a configuration example of the data collection system according to the embodiment. Note that the data collection system 1 illustrated in FIG. 2 may include a plurality of data collection devices 100.

The data collection device 100 is a server device (information processing device) that requests the sensor device 10 for data specified to have a beneficial effect or influence in machine learning, data specified to be lacking, or data similar to any of them. In addition, the data collection device 100 executes the training process using the dataset.

The sensor device 10 is a device (computer) that provides data to the data collection device 100 in response to a request from the data collection device 100. Each sensor device 10 acquires data by sensing performed by the sensor unit 16 (refer to FIG. 8). The sensor device 10 transmits, to the data collection device 100, data that satisfies a collection condition including at least one of a consent of a subject or a right holder of data as a target of data collection by the sensor unit 16, a judgment criterion for a location where sensing is performed by the sensor unit 16, and a data collection criterion.

In the example of FIG. 2, the sensor device 10a is a mobile body including a UAV such as a drone or a vehicle such as an automobile. For example, the sensor device 10a may have a function of communicating with the data collection device 100 and perform movement according to a request from the data collection device 100. The sensor device 10a has an imaging function such as an image sensor (imager), moves to a position according to the request from the data collection device 100, captures an image or a movie at the position, and transmits the captured image or movie to the data collection device 100. At that time, for example, the setting such as the resolution, the angle of view, the luminance, and the frame rate of the image data or the characteristics of the data may be changed according to the effect or influence on the learning.

Furthermore, in the example of FIG. 2, the sensor device 10b is a camera having an imaging function. The sensor device 10b is a camera that captures a movie or an image and holds captured data. For example, the sensor device 10b captures an image or a movie in response to a request from the data collection device 100, and transmits the captured image or movie to the data collection device 100.

In the example of FIG. 2, the sensor device 10c is an image sensor (imager) having an imaging function. For example, the sensor device 10c has a function of communicating with the data collection device 100, and has a function of transmitting a captured image and movie to the data collection device 100. For example, the sensor device 10c captures an image or a movie in response to a request from the data collection device 100, and transmits the captured image or movie to the data collection device 100. At that time, for example, the setting such as the resolution, the angle of view, the luminance, and the frame rate of the image data or the characteristics of the data may be changed according to the effect or influence on the learning.

In the example of FIG. 2, the sensor device 10d is provided as AR glasses. The sensor device 10d is a sensor device 10 having a function of displaying information. The sensor device 10d has an imaging function such as an image sensor (imager), captures an image or a movie according to a request from the data collection device 100, and transmits the captured image or movie to the data collection device 100. For example, the sensor device 10d performs superimposing display of information having transparency so as to allow the information to be superimposed over a range in which an image is captured.

The sensor device 10d may be any device as long as the device has a function of displaying information, such as a monitor, VR glasses, and a windshield of a mobile body (automobile etc.), for example.

The sensor device 10 may be any device as long as it can perform sensing by a sensor and provide collected information to the data collection device 100. Furthermore, the sensor device 10 may be a device such as a smartphone, a tablet terminal, a laptop personal computer (PC), a desktop PC, a mobile phone, or a personal digital assistant (PDA), for example. The sensor device 10 may be a wearable terminal or the like worn by the user like the above-described AR glasses. For example, the sensor device 10 may be a wristwatch-type terminal, an eyeglass-type terminal, or the like. Furthermore, the sensor device 10 may be a home appliance such as a television or a refrigerator. For example, the sensor device 10 may be a robot that interacts with a human (user), such as a robot referred to as a smart speaker, an entertainment robot, or a home robot. Furthermore, the sensor device 10 may be a device disposed at a predetermined position such as a digital signage.

[1-3. Configuration of Data Collection Device According to Embodiment]

Figure 3:
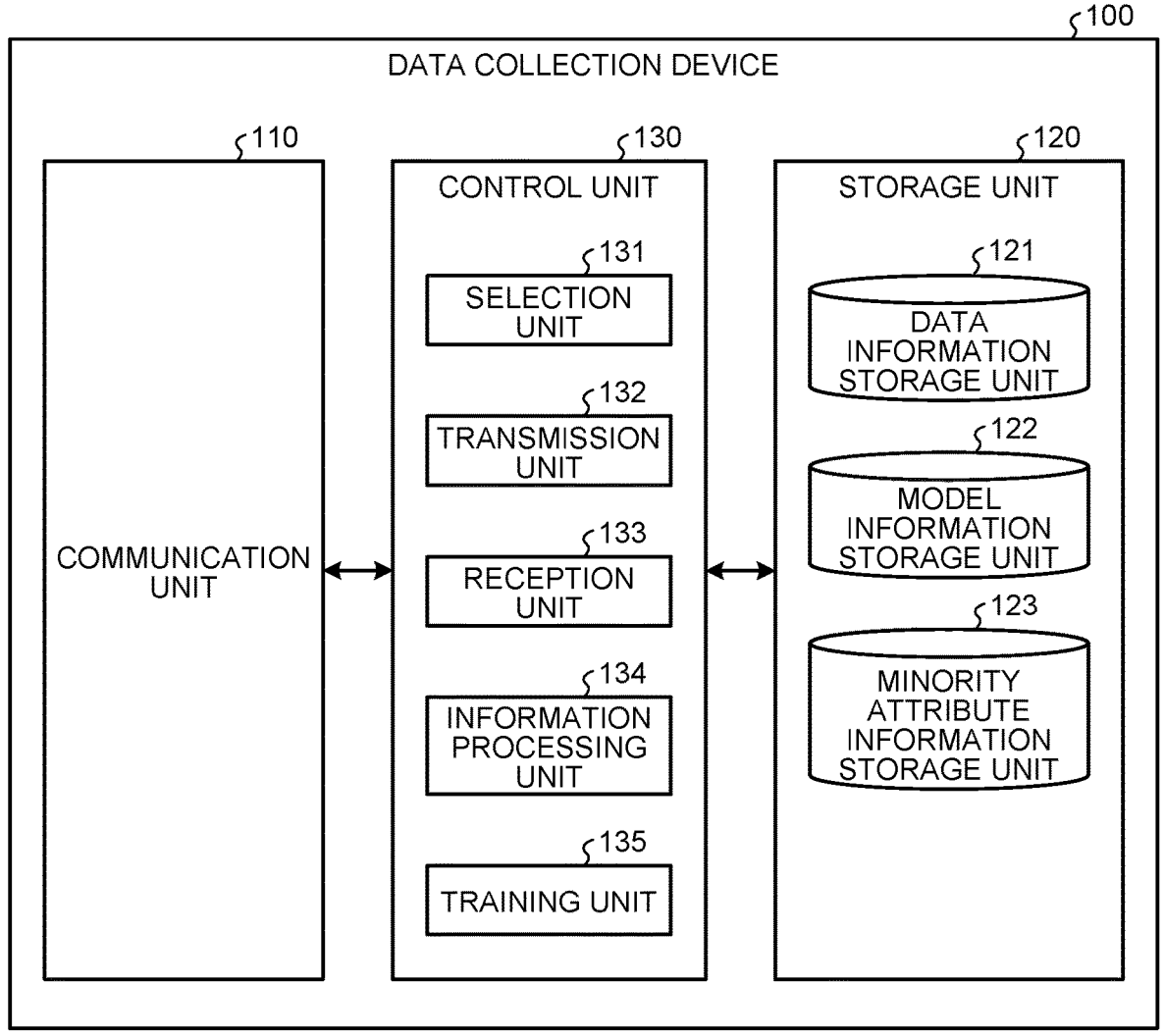
FIG. 3 is a diagram illustrating a configuration example of a data collection device according to the embodiment of the present disclosure.

Next, a configuration of the data collection device 100, which is an example of the data collection device that executes the data collection processing according to the embodiment, will be described. FIG. 3 is a diagram illustrating a configuration example of a data collection device 100 according to the embodiment of the present disclosure.

As illustrated in FIG. 3, the data collection device 100 includes a communication unit 110, a storage unit 120, and a control unit 130. Note that, the data collection device 100 may include an input unit (for example, a keyboard, a mouse, etc.) that receives various operations from an administrator or the like of the data collection device 100, and a display unit (for example, a liquid crystal display, etc.) for displaying various types of information.

The communication unit 110 is implemented by a network interface card (NIC), for example. The communication unit 110 is connected to the network N (refer to FIG. 2) in a wired or wireless channel, and transmits/receives information to/from another information processing device such as the sensor device 10. Furthermore, the communication unit 110 may transmit and receive information to and from the sensor device 10.

The storage unit 120 is implemented by semiconductor memory elements such as random access memory (RAM) and flash memory, or other storage devices such as a hard disk or an optical disc. As illustrated in FIG. 3, the storage unit 120 according to the embodiment includes the data information storage unit 121, a model information storage unit 122, and a minority attribute information storage unit 123.

The data information storage unit 121 according to the embodiment stores various types of information related to data used for learning. The data information storage unit 121 stores training data (dataset) used for learning. FIG. 4 is a diagram illustrating an example of a data information storage unit according to the embodiment of the present disclosure. For example, the data information storage unit 121 stores various types of information related to various types of data such as training data used for learning and evaluation data used for accuracy evaluation (measurement). FIG. 4 illustrates an example of the data information storage unit

121 according to the embodiment. In the example of FIG. 4, the data information storage unit 121 includes items such as "dataset ID", "data ID", "data", "attribute #1", and "attribute #2".

The "dataset ID" indicates identification information for identifying the dataset. The "data ID" indicates identification information for identifying an object. In addition, "data" indicates data corresponding to the object identified by the data ID. That is, in the example of FIG. 4, vector data (data) corresponding to an object is registered in association with a data ID for identifying the object.

"Attribute #1" and "attribute #2" indicate attributes corresponding to respective targets of corresponding data. "Attribute #1" is an attribute related to age, and indicates whether each data corresponds to an adult or a child. "Attribute #2" is an attribute related to gender, and indicates whether each data corresponds to male or female.

Although in the example of FIG. 4, the attribute (category) includes an adult, a child, a male, a female, and the like s an example, the attribute is not limited to the above, and may be various attributes. It is allowable to store not only "attribute #1" and "attribute #2" but also three or more attributes such as "attribute #3" and "attribute #4". For example, "attribute #3" may be an attribute related to race. Further, the attribute is not limited to the attribute related to outer aspects, and may be an attribute related to inner aspects, such as various demographic attributes or psychographic attributes.

The example of FIG. 4 illustrates that the dataset (dataset DS1) identified by the dataset ID "DS1" includes a plurality of pieces of data identified by data IDs "DID1", "DID2", "DID3", and the like.

The data DT1 identified by the data ID "DID1" indicates that the data corresponds to an adult male. For example, the data DT1 is a captured image of a male adult.

In addition, the data DT2 identified by the data ID "DID2" indicates that the data corresponds to a female child. For example, the data DT2 is a captured image of a female child. The example of FIG. 4 is a case where the data DT1 and DT3 to DT8 other than the data DT2 are captured images of adults, with a low proportion of captured images of a child.

Note that the data information storage unit 121 is not limited to the above, and may store various types of information depending on the purpose. The data information storage unit 121 stores ground truth information (ground truth label) corresponding to each data in association with each data. For example, the data information storage unit 121 may use the attributes stored in "attribute #1" and "attribute #2" as the ground truth information.

In addition, the data information storage unit 121 may store data such that whether each data is training data or evaluation data can be specified. For example, the data information storage unit 121 stores the training data and the evaluation data so as to be distinguishable from each other. The data information storage unit 121 may store information for identifying whether each data is training data or evaluation data. The data collection device 100 learns a model based on each data used as training data and ground truth information. The data collection device 100 measures the accuracy of the model based on each data used as the evaluation data and the ground truth information. By collecting a result obtained by comparing the output result output from the model when the evaluation data is input with the ground truth information, the data collection device 100 measures the accuracy of the model.

The model information storage unit 122 according to the embodiment stores information related to a model. For example, the model information storage unit 122 stores information (model data) indicating a structure of a model (network). FIG. 5 is a diagram illustrating an example of a model information storage unit according to the embodiment of the present disclosure. FIG. 5 illustrates an example of the model information storage unit 122 according to the embodiment. In the example illustrated in FIG. 5, the model information storage unit 122 includes items such as "model ID", "application", and "model data".

The "model ID" indicates identification information for identifying the model. "Application" indicates an application of the corresponding model. "Model data" indicates data regarding the model. Although FIG. 5 illustrates an example in which "model data" stores conceptual information such as "MDT1", "model data" actually stores information including various types of information constituting the model, such as information regarding a network and a function included in the model.

In the example illustrated in FIG. 5, the model (model M1) identified by the model ID "M1" indicates that the application is "image recognition". The model M1 is a model used for image recognition. For example, the model M1 is used to detect a person. The model data of the model M1 indicates the model data MDT1.

The model information storage unit 122 may store various types of information according to a purpose, not limited to the above. For example, the model information storage unit 122 stores parameter information of a model trained (generated) by the training process.

Figure 6:
FIG. 6 is a diagram illustrating an example of a minority attribute information storage unit according to the embodiment of the present disclosure.

The minority attribute information storage unit 123 according to the embodiment stores various types of information regarding the minority attribute (minority category). FIG. 6 is a diagram illustrating an example of a minority attribute information storage unit according to the embodiment. The minority attribute information storage unit 123 illustrated in FIG. 6 includes items such as "minority attribute" and "proportion".

The "minority attribute" indicates a minority attribute. The "minority attribute" indicates an attribute having a proportion smaller than a predetermined threshold (for example, 0.1 or 0.15) in the retained data stored in the data information storage unit 121. The "proportion" indicates a specific value of the proportion of data corresponding to the minority attribute in the retained data stored in the data information storage unit 121.

The example of FIG. 6 indicates that "child" corresponds to the minority attribute. The proportion of the minority attribute "child" indicates "0.02". In this case, 2% of the retained data stored in the data information storage unit 121 is captured images of children, and the remaining 98% is captured images of adults.

Note that the minority attribute information storage unit 123 may store various types of information according to a purpose, not limited to the above.

Returning to FIG. 3, and description will continue. The control unit 130 is actualized by execution of programs stored in the data collection device 100 (for example, information processing program such as a data collection processing program according to the present disclosure) by a central processing unit (CPU), a micro processing unit (MPU), or the like, using random access memory (RAM) or the like, as a working area. In addition, the control unit 130 is a controller and is implemented by, for example, an integrated circuit such as an application specific integrated circuit (ASIC) or a field programmable gate array (FPGA).

As illustrated in FIG. 3, the control unit 130 includes a selection unit 131, a transmission unit 132, a reception unit 133, an information processing unit 134, and a training unit 135, and implements or executes a function and an action of information processing described below. The internal configuration of the control unit 130 is not limited to the configuration illustrated in FIG. 3, and may be another configuration as long as it is a configuration that performs information processing described below. Furthermore, the connection relationship of the processing units included in the control unit 130 is not limited to the connection relationship illustrated in FIG. 3, and may be a different connection relationship.

The selection unit 131 executes selection processing of performing various selections. The selection unit functions as a data analysis unit. The selection unit 131 performs selection processing based on various types of information. The selection unit 131 selects data to be requested from the sensor device 10 according to the imbalance of the data configuration included in the data used for the machine learning and the beneficial effect and influence in the machine learning. The selection unit 131 selects data to be requested to the sensor device 10 according to data configuration imbalance included in the retained data stored in the data information storage unit 121, beneficial influence on learning specified by XAI, or the like.

The selection unit 131 specifies data specified as lacking based on the retained data. The selection unit 131 selects minority attribute data, namely, data that is included in the retained data with lower rate than other attributes, or data similar to the minority attribute data, as data to be requested from the sensor device 10. The selection unit 131 determines, as data to be requested from the sensor device 10, data of a minority attribute having less corresponding data among attributes corresponding to data included in the retained data stored in the data information storage unit 121.

The transmission unit 132 transmits various types of information. The transmission unit 132 transmits, to a sensor device 50, a request signal for collecting data beneficial for the training of the learning model, lacking data, or data similar to any of the data. The transmission unit 132 requests various types of information from an external device such as the sensor device 10. By transmitting request information of designating data to the sensor device 10, the transmission unit 132 requests data from the sensor device 10.

The transmission unit 132 requests the sensor device 10 including the sensor unit 16 for data selected as necessary based on the retained data. The transmission unit 132 requests the sensor device 10 for the data selected by the selection unit 131. The transmission unit 132 requests data from the sensor device 10 having an image sensor that captures images.

The reception unit 133 receives various types of information. The reception unit 133 receives various types of information from an external information processing device. The reception unit 133 acquires various types of information from the sensor device 10.

The reception unit 133 acquires various types of information from the storage unit 120. The reception unit 133 acquires various types of information from the data information storage unit 121, the model information storage unit 122, and the minority attribute information storage unit 123.

The reception unit 133 receives data corresponding to the request signal, from the sensor device 50. 133 receives, from the sensor device 10, data that satisfies a collection condition including at least one of a consent of a subject or a right holder of data as a target of data collection by the sensor unit 16, a judgment criterion for a location where data collection is performed by the sensor unit 16, and a data collection criterion. The reception unit 133 receives an image including a person from the sensor device 10.

The information processing unit 134 performs change processing on various types of information. The information processing unit 134 edits the image to change the image. The information processing unit 134 generates a changed image by changing the original image. The information processing unit 134 changes the face of a person in the image to the face of another person different from the person. In a case where the face of the person in the image is pixelated, the information processing unit 134 changes the pixelated region to the face of another person.

The information processing unit 134 changes the face of a person in the image to the face of another person. The information processing unit 134 specifies a region including the face of a person from the image by a face recognition technology or the like, and performs editing of replacing the specified region with a face of another person, thereby generating a changed image in which the face of one person in the image has been changed to the face of another person. The information processing unit 134 changes the face of a person in an image to a face of another person by using a Generative Adversarial Network (GAN) technology. The information processing unit 134 may use the image of the face of a person (authorized user) who is authorized to use the face image stored in the storage unit 120 and thereby change the face of the person in the image to the face of the authorized user.

Furthermore, in a case where there is a pixelated region in the image, the information processing unit 134 generates a changed image in which the face of another person is arranged in the region. The information processing unit 134 specifies a pixelated region from the image by an image recognition technique or the like, and performs editing to replace the specified region with the face of another person, thereby generating a changed image in which the face of another person is arranged.

The training unit 135 performs training on various types of information. The training unit 135 performs training on various types of information based on information from an external information processing device or information stored in the storage unit 120. The training unit 135 performs training on various types of information based on the information stored in the data information storage unit 121. The training unit 135 stores a model generated by the training in the model information storage unit 122.

The training unit 135 performs training process. The training unit 135 performs various types of training. The training unit 135 performs training on various types of information based on the information received by the reception unit 133. The training unit 135 trains (generates) the model. The training unit 135 performs training on various types of information such as a model. The training unit 135 generates a model by training. The training unit 135 trains the model using various techniques related to machine learning. For example, the training unit 135 performs training on parameters of a model (network). The training unit 135 trains the model using various techniques related to machine learning.

The training unit 135 performs training on parameters of a network. For example, the training unit 135 performs training on parameters of a network of the model M1. The training unit 135 performs training on parameters of the network of the model M1.

The training unit 135 performs training process based on the training data (teacher data) stored in the data information storage unit 121. By performing training process using the training data stored in the data information storage unit 121, the training unit 135 generates the model M1. For example, the training unit 135 generates a model used for image recognition. The training unit 135 performs training on the parameters of the network of the model M1, thereby generating the model M1.

The method of training used by the training unit 135 is not particularly limited. However, one example of the method of training may be the method of preparing training data in which label information (such as a label indicating an object or a person in an image) and an image group are associated with each other, and inputting the training data to a calculation model based on a multilayer neural network. Furthermore, for example, it is also allowable to use a method based on a deep neural network (DNN) such as a convolutional neural network (CNN) or a 3D-CNN. In a case where the time series data such as a moving image (movie) such as a video is targeted, the training unit 135 may use a method based on a Recurrent Neural Network (RNN) or a Long Short-Term Memory unit (LSTM) which is an extension of the RNN.

The training unit 135 executes a training process using the dataset. The training unit 135 adds the data received by the reception unit 133 to the training data and executes a training process of the neural network using the training data with the added data. By executing the training process using the added dataset, the training unit 135 updates the model M1.

[1-3-1. Model (Network) Example]

As described above, the data collection device 100 may use a model (network) in the form of a neural network (NN) such as a deep neural network (DNN). Note that the data collection device 100 may use various types of models (functions) including a regression model such as a support vector machine (SVM), not limited to the neural network. In this manner, the data collection device 100 may use a model (function) of any format. The data collection device 100 may use various regression models such as a nonlinear regression model and a linear regression model.

Figure 7:
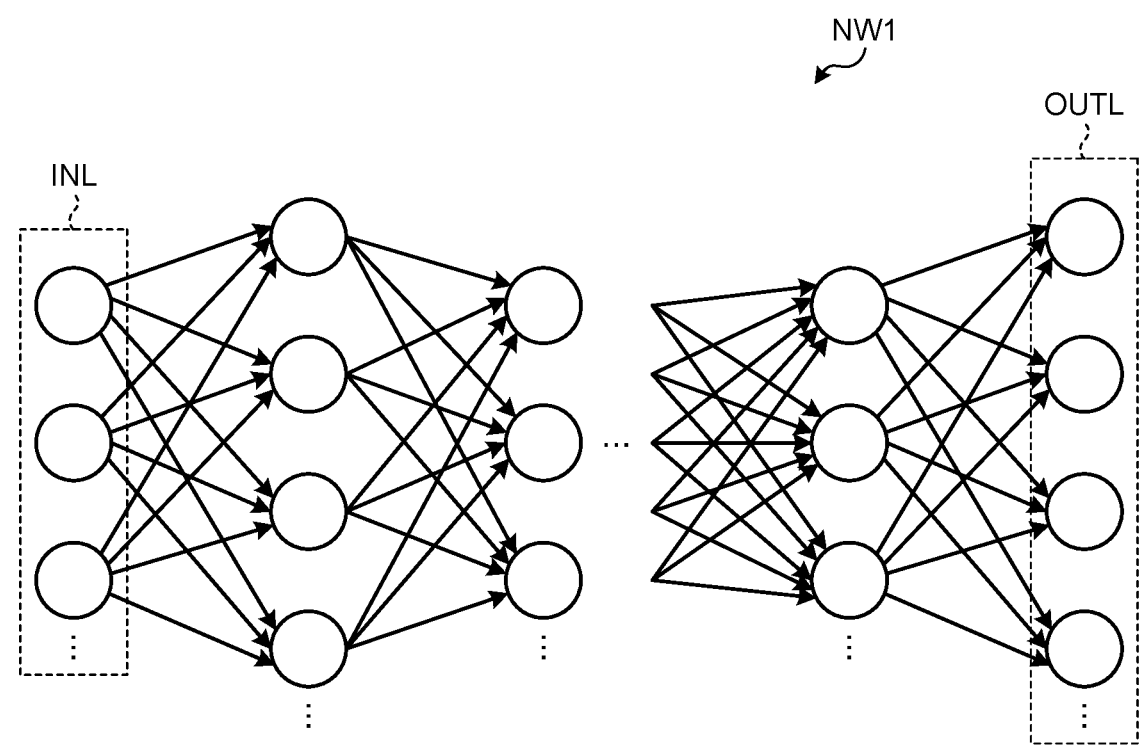
FIG. 7 is a diagram illustrating an example of a network corresponding to a model.

In this regard, an example of the network structure of the model will be described with reference to FIG. 7. FIG. 7 is a diagram illustrating an example of a network corresponding to the model. A network NW1 in FIG. 7 illustrates a neural network including a plurality of (multilayer) intermediate layers between an input layer INL and an output layer OUTL. The network NW1 illustrated in FIG. 7 corresponds to the model M1 which is the neural network in FIG. 1. For example, the data collection device 100 may perform training on parameters of the network NW1 illustrated in FIG. 7.

A network NW1 illustrated in FIG. 7 corresponds to the network of the model M1, providing a conceptual diagram illustrating a neural network (model) used for image recognition. For example, when an image is input from the input layer INL, for example, the network NW1 outputs the recognition result from the output layer OUTL. For example, the data collection device 100 inputs information to the input layer INL in the network NW1, so as to allow a recognition result corresponding to the input to be output from the output layer OUTL.

In FIG. 7, the network NW1 is illustrated as an example of a model (network), but the network NW1 may be provided in various forms depending on the application and the like. For example, the data collection device 100 trains the model M1 by performing training on parameters (weights) of the model M1 having the structure of the network NW1 illustrated in FIG. 7.

[1-4. Configuration of Sensor Device According to Embodiment]

Figures 8, 9:
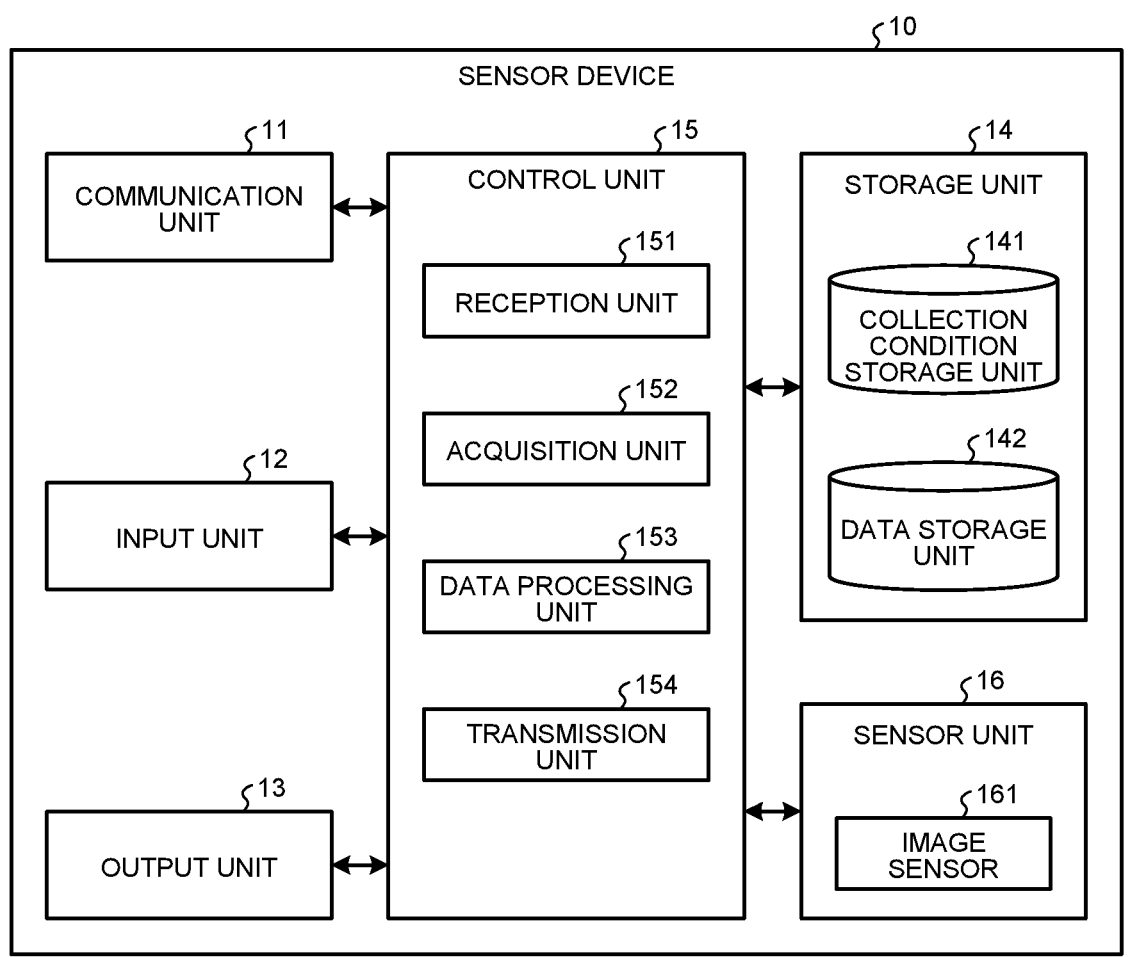
FIG. 8 is a diagram illustrating a configuration example of a sensor device according to the embodiment of the present disclosure.
FIG. 9 is a diagram illustrating an example of a collection condition storage unit according to the embodiment of the present disclosure.

Next, a configuration of the sensor device 10, which is an example of a sensor device that executes information processing according to the embodiment, will be described. FIG. 8 is a diagram illustrating a configuration example of a sensor device according to the embodiment of the present disclosure.

As illustrated in FIG. 8, the sensor device 10 includes a communication unit 11, an input unit 12, an output unit 13, a storage unit 14, a control unit 15, and a sensor unit 16. The sensor device 10 may have any device configuration as long as it can collect data and provide the data to the data collection device 100. For example, as long as the sensor device 10 includes the communication unit 11 that communicates with the data collection device 100 and the control unit 15 that performs processing of collecting data, other configurations may be provided optionally. Depending on the type of the sensor device 10, for example, the sensor device 10 may omit some of the input unit 12, the output unit 13, the storage unit 14, or the sensor unit 16.

For example, in a case where the sensor device 10 is an image sensor (imager), the sensor device 10 may be a configuration including only the communication unit 11, the control unit 15, and the sensor unit 16. For example, an imaging element used in an image sensor (imager) is a complementary metal oxide semiconductor (CMOS). The imaging element used for the image sensor (imager) is not limited to the CMOS, and may be various imaging elements such as a charge coupled device (CCD). Furthermore, for example, in a case where the sensor device 10 is a data server, the sensor device 10 may have a configuration including only the communication unit 11, the storage unit 14, and the control unit 15. Furthermore, for example, in a case where the sensor device 10 is a mobile body, the sensor device 10 may have a configuration including a mechanism for actualizing movement of a drive unit (motor) or the like.

The communication unit 11 is implemented by, for example, an NIC, a communication circuit, or the like. The communication unit 11 is connected to a network N (the Internet, or the like) in a wired or wireless channel, and transmits/receives information to/from other devices such as the data collection device 100, via the network N.

The input unit 12 receives various inputs. The input unit 12 receives user's operations. The input unit 12 may receive an operation (user's operation) on the sensor device 10 used by the user, as an operation input performed by the user. The input unit 12 may receive information regarding a user's operation using a remote controller via the communication unit 11. Furthermore, the input unit 12 may include a button provided on the sensor device 10, or a keyboard or a mouse connected to the sensor device 10.

For example, the input unit 12 may have a touch panel capable of actualizing functions equivalent to those of a remote controller, a keyboard and a mouse. In this case, various types of information are input to the input unit 12 via a display (output unit 13). The input unit 12 receives various operations from the user via a display screen by using a function of a touch panel actualized by various sensors. That is, the input unit 12 receives various operations from the user via the display (output unit 13) of the sensor device 10. For example, the input unit 12 receives a user's operation via a display (output unit 13) of the sensor device 10.

The output unit 13 outputs various types of information. The output unit 13 has a function of displaying information. The output unit 13 is provided in the sensor device 10 and displays various types of information. The output unit 13 is implemented by a device such as a liquid crystal display, an organic electro-luminescence (EL) display, for example. In a case where the sensor device 10 is provided as AR glasses, the output unit 13 includes a display having transparency. The output unit 13 may have a function of outputting a sound. For example, the output unit 13 includes a speaker that outputs sound.

The storage unit 14 is implemented by semiconductor memory elements such as random access memory (RAM) and flash drives, or storage devices such as a hard disk or an optical disk. The storage unit 14 stores various types of information used for displaying information. The storage unit 14 includes a collection condition storage unit 141 and a data storage unit 142.

The collection condition storage unit 141 according to the embodiment stores various types of information related to data collection conditions. The collection condition storage unit 141 stores conditions of data to be collected as data to be used for training. FIG. 9 is a diagram illustrating an example of a collection condition storage unit according to the embodiment of the present disclosure. In the example of FIG. 4, the collection condition storage unit 141 includes items such as "condition ID" and "collection condition information".

The "condition ID" indicates identification information for identifying the collection condition. The "collection condition information" indicates a condition of data to be collected. The example of FIG. 9 indicates that the collection condition identified by the condition ID "CD1" corresponds to collection condition information INF1. Although being illustrated in an abstract manner such as "INF1" in the example of FIG. 9, the "collection condition information" may store information representing a specific criterion indicating what types of data to be collected.

The "collection condition information" stores a collection condition related to privacy. The "collection condition information" stores a collection condition including at least one of a consent of a subject or a right holder of data to be collected by the sensor, a judgment criterion for a location where data collection is performed by the sensor, and a data collection criterion. The "collection condition information" stores a collection condition indicating whether there is a need to have a consent from a person included in an image. The "collection condition information" stores a collection condition indicating a collection criterion based on the law or ordinance of a nation or an administrative district where the data collection by the sensor is performed. In the case of an image including a human face, the "collection condition information" stores information indicating whether to edit the human face.

Note that the collection condition storage unit 141 may store various types of information depending on the purpose, not limited to the information described above.

The data storage unit 142 stores various types of information related to data acquired by data collection of the sensor unit 16. The data storage unit 142 stores an image captured by the image sensor 161.

The data storage unit 142 stores each acquired data in association with identification information (ID) for identifying the data and a collected date and time. In addition, in a case where the sensor unit 16 collects a plurality of types of data such as an image and a sound, each data is stored in association with the type of the data. In addition, the data storage unit 142 stores each piece of data in association with information indicating the presence or absence of consent of a subject (person) or a right holder of the data as a collection target of the data. For example, in a case where there is consent from a subject (person) who is a collection target of the data regarding the use of data for learning, the data storage unit 142 stores information indicating that the consent of the person has been acquired in association with the data.

Returning to FIG. 8, and description will continue. The control unit 15 is implemented by execution of programs stored in the sensor device 10 (for example, an information processing program such as data providing program according to the present disclosure) by the CPU, MPU, or the like, using RAM or the like as a working area. Furthermore, the control unit 15 may be a controller and may be implemented by using an integrated circuit such as an ASIC or an FPGA, for example.

As illustrated in FIG. 8, the control unit 15 includes a reception unit 151, an acquisition unit 152, a data processing unit 153, and a transmission unit 154, and implements or executes a function and an action of information processing described below. The internal configuration of the control unit 15 is not limited to the configuration illustrated in FIG. 8, and may be any other configuration as long as it is a configuration that performs information processing described below.

The reception unit 151 receives various types of information. The reception unit 151 receives various types of information from an external information processing device. The reception unit 151 receives various types of information from another information processing device such as the data collection device 100.

The reception unit 151 receives information indicating data required by the data collection device 100. The reception unit 151 receives the request information from the data collection device 100.

The acquisition unit 152 acquires various types of information. The acquisition unit 152 acquires various types of information from the storage unit 14. The acquisition unit 152 acquires various types of information from the collection condition storage unit 141 and the data storage unit 142.

The acquisition unit 152 acquires data corresponding to the request information received by the reception unit 151. The acquisition unit 152 extracts, from the data storage unit 142, data corresponding to the request information received by the reception unit 151. The acquisition unit 152 extracts data corresponding to the attribute "child".

The data processing unit 153 performs data processing of editing information. The data processing unit 153 edits the sensor information collected by the sensor unit 16. The data processing unit 153 edits the image collected by the image sensor 161.

When the data collected by the sensor unit 16 does not satisfy the collection condition, the data processing unit 153 edits the data so as to satisfy the collection condition. In a case where the image captured by the sensor unit 16 does not satisfy the collection condition related to privacy, the data processing unit 153 edits the image using correction for protecting privacy.

In a case where the image does not satisfy the collection condition related to privacy, the data processing unit 153 processes the face of a person included in the image. The data processing unit 153 applies pixelation on the face of a human. The data processing unit 153 changes the face of a person to the face of another person different from the person. The data processing unit 153 processes the face of the corresponding person included in the image without the consent of the corresponding person.

The data processing unit 153 applies pixelation on the face of the person in each target image extracted by the acquisition unit 152. The data processing unit 153 specifies a region including the face of the person from the image by a face recognition technique or the like, and applies pixelation on the specified region, thereby generating an edited image including the face of the person that has undergone pixelation.

The data processing unit 153 performs editing to change the face of the person in the image to the face of another person. The data processing unit 153 specifies a region including the face of a person from the image by a face recognition technology or the like, and performs editing of replacing the specified region with the face of another person, thereby generating a changed image in which the face of the person in the image has been edited to the face of another person. The data processing unit 153 changes the face of the person in the image to the face of another person using the GAN technology. The data processing unit 153 may use the image of the face of a person (authorized user) who is authorized to use the face image stored in the storage unit 14 and thereby change the face of the person in the image to the face of the authorized user.

The transmission unit 154 transmits various types of information to an external information processing device. For example, the transmission unit 154 transmits various types of information to another information processing device such as the data collection device 100. The transmission unit 154 transmits the information stored in the storage unit 14. The transmission unit 154 transmits various types of information in response to a request from another information processing device such as the data collection device 100. The transmission unit 154 transmits various types of information based on the information stored in the storage unit 14.

The transmission unit 154 transmits the sensor information collected by the sensor unit 16 to the data collection device 100. The transmission unit 154 transmits an image captured by the image sensor 161 (image sensor) of the sensor unit 16 to the data collection device 100.

The transmission unit 154 transmits the provision data collected as data corresponding to the request information to an external device. The transmission unit 154 transmits the provision data collected as the data corresponding to the request information to the data collection device 100. The transmission unit 154 transmits the data acquired by the acquisition unit 152 to the data collection device 100. The transmission unit 154 transmits the collection data including the edited image group edited by the data processing unit 153 to the data collection device 100.

The transmission unit 154 transmits, to the data collection device 100, data that satisfies a collection condition including at least one of a consent of a subject as a target of data collection by the sensor unit 16, a judgment criterion for a location where data collection is performed by the sensor unit 16, and a data collection criterion. The transmission unit 154 transmits data to the data collection device 100 in response to a data request from the data collection device 100.

The transmission unit 154 transmits data edited by the data processing unit 153 and satisfying the collection condition to the data collection device 100. The transmission unit 154 transmits, to the data collection device 100, data that satisfies a collection condition related to privacy of a person as the subject. The transmission unit 154 transmits the image edited by the data processing unit 153 to the data collection device 100. The transmission unit 154 transmits the image in which the face of the corresponding person is edited by the data processing unit 153 to the data collection device 100.

The sensor unit 16 includes a sensor. The sensor unit 16 includes an image sensor 161 that captures an image. By using the image sensor 161, the sensor unit 16 captures an image of the corresponding person, which corresponds to the attribute requested by the data collection device 100.

Note that the sensor unit 16 is not limited to the above, and may include various sensors. The sensor unit 16 may include various sensors such as a sound sensor, a position sensor, an acceleration sensor, a gyro sensor, a temperature sensor, a humidity sensor, an illuminance sensor, a pressure sensor, a proximity sensor, and a sensor for receiving biological information such as smell, sweat, heartbeat, pulse, and brain waves. In addition, the sensor that collects the various types of information described above in the sensor unit 16 may be the same type of sensors or may be different types of sensors.

[1-5. Procedure of Information Processing According to Embodiment]

Next, various types of information processing procedures according to the embodiment will be described with reference to FIGS. 10 and 12.

[1-5-1. Procedure of Processing Related to Data Collection Device]

First, a flow of processing according to the data collection device according to the embodiment of the present disclosure will be described with reference to FIG. 10. FIG. 10 is a flowchart illustrating processing of the data collection device according to the embodiment of the present disclosure. Specifically, FIG. 10 is a flowchart illustrating a procedure of information processing by the data collection device 100.

Figure 10:
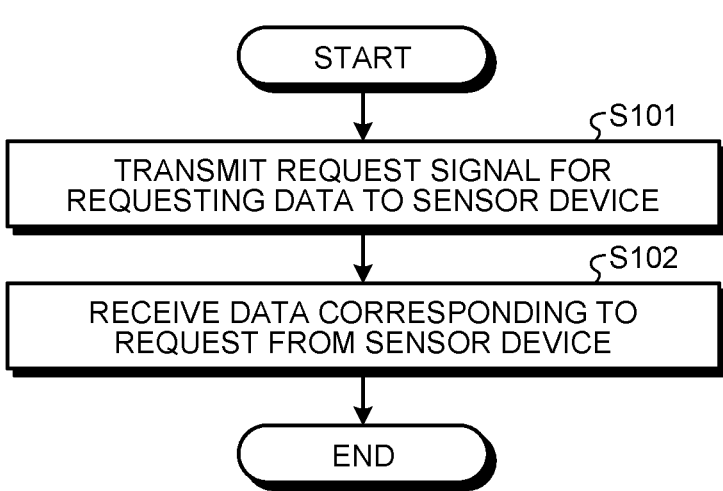
FIG. 10 is a flowchart illustrating processing of the data collection device according to the embodiment of the present disclosure.

As illustrated in FIG. 10, the data collection device 100 transmits a request signal of requesting data to the sensor device (step S101). For example, the data collection device 100 transmits, to the sensor device 10, a request signal for collecting data beneficial for or lacking in the training of a learning model that performs output according to a learning result, corresponding to input, or data similar to the data. Subsequently, the data collection device 100 receives data corresponding to the request from the sensor device (step S102). For example, the data collection device 100 receives data corresponding to the request signal from the sensor device 10.

[1-5-2. Procedure of Processing Related to Sensor Device]

Figure 11:
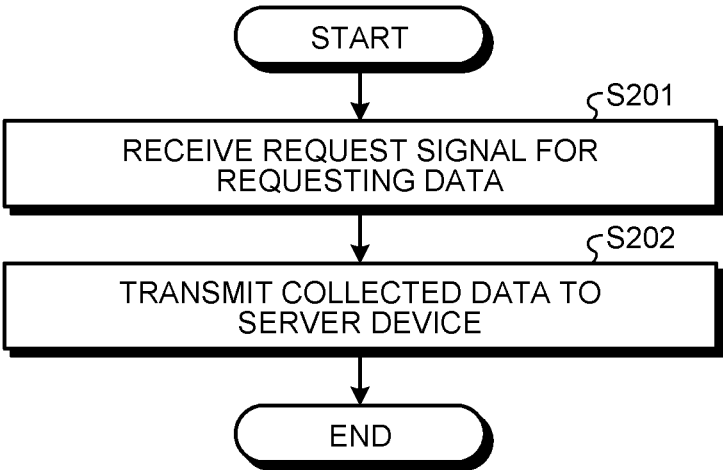
FIG. 11 is a flowchart illustrating processing of the sensor device according to the embodiment of the present disclosure.

Next, a flow of processing related to the data collection device according to the embodiment of the present disclosure will be described with reference to FIG. 11. FIG. 11 is a flowchart illustrating processing of the sensor device according to the embodiment of the present disclosure. Specifically, FIG. 11 is a flowchart illustrating a procedure of information processing by the sensor device 10.

As illustrated in FIG. 11, the sensor device 10 receives a request signal for requesting data (step S201). For example, the sensor device 10 receives, from the data collection device 100, a request signal for requesting data beneficial for the training of the learning model used by the data collection device 100, lacking data, or data similar to the data. Subsequently, the sensor device 10 transmits the collected data to the server device (step S202). For example, the sensor device 10 collects beneficial data, lacking data, or similar data based on the request signal, and transmits the collected data to the data collection device 100.

[1-5-3. Procedure of Processing Related to Data Collection System]

Next, an example of specific processing related to the data collection system will be described with reference to FIG. 12. FIG. 12 is a sequence diagram illustrating a processing procedure of the data collection system according to the embodiment of the present disclosure.

Figure 12:
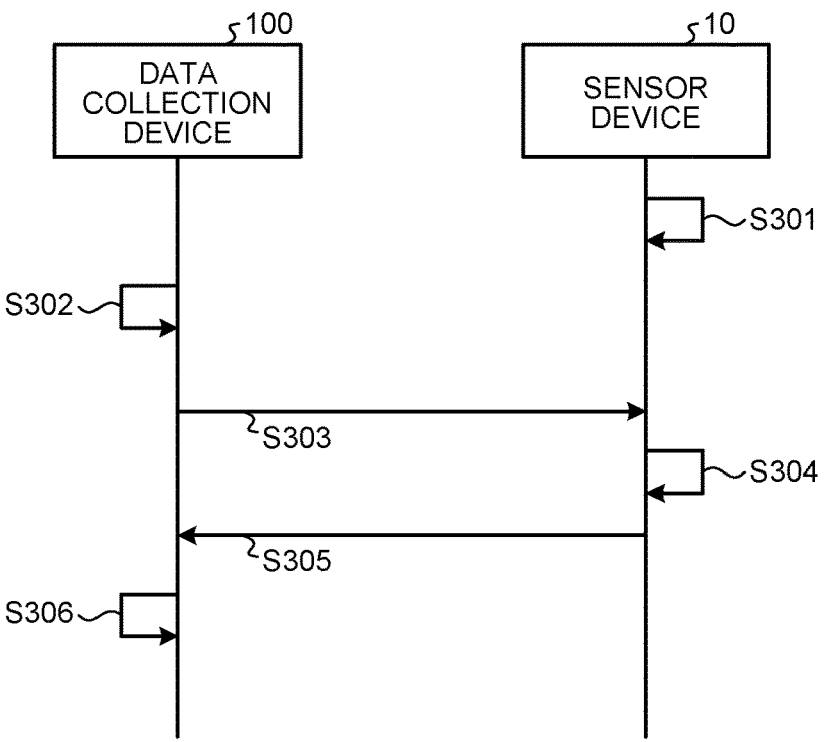
FIG. 12 is a sequence diagram illustrating a processing procedure of the data collection system according to the embodiment of the present disclosure.

As illustrated in FIG. 12, the sensor device 10 acquires data by the sensor (step S301). For example, the sensor device 10 acquires an image by the image sensor 161.

The data collection device 100 determines necessary data based on the retained data used for machine learning (step S302). For example, the data collection device 100 determines minority attribute data as necessary data.

The data collection device 100 requests data from the sensor device 10 (step S303). For example, the data collection device 100 requests the sensor device 10 to transmit an image including a captured image of the minority attribute "child".

The sensor device 10 edits the data (step S304). For example, the sensor device 10 applied pixelation editing on the face of the child in the image. The sensor device 10 transmits the edited data to the data collection device 100 (step S305). For example, the sensor device 10 transmits an edited image obtained by pixelating the face of the child in the image to the data collection device 100.

The data collection device 100 that has received the data from the sensor device 10 adds the received data as training data (step S306). For example, the data collection device 100 adds the received edited image to the dataset used for the training.

[1-6. Data Collection and Training Process Example of Minority Attribute]

Figure 13:
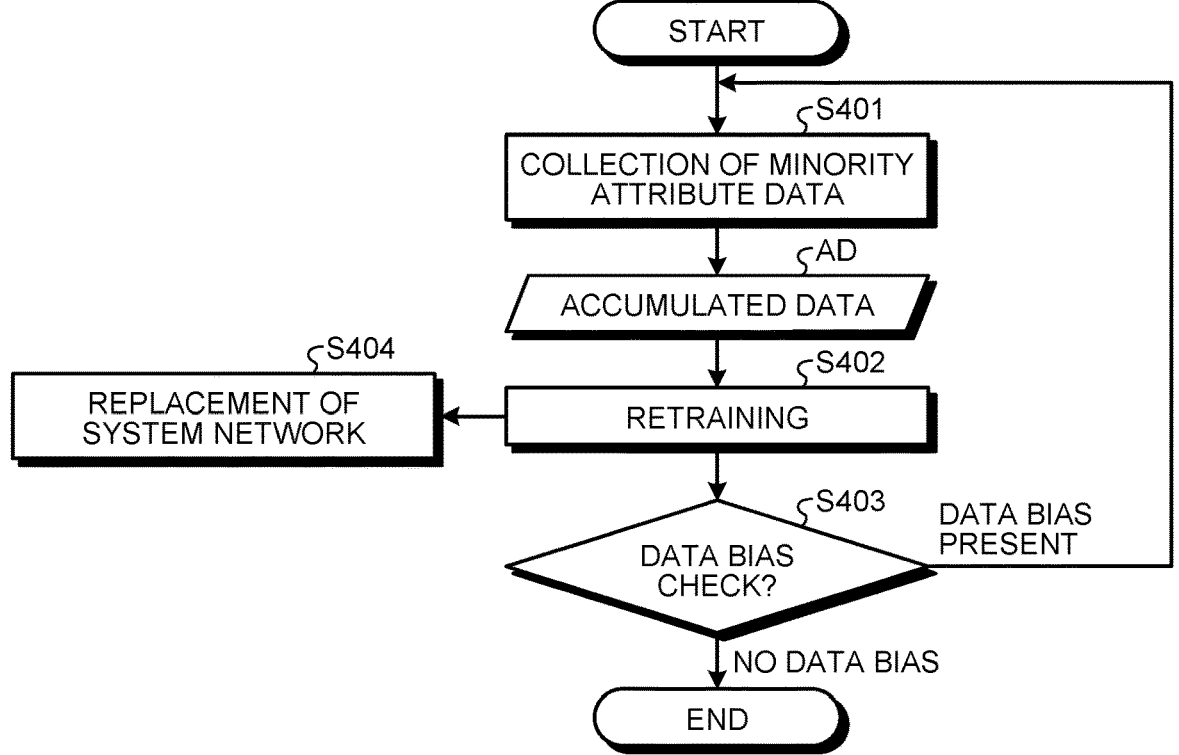
FIG. 13 is a flowchart illustrating an example of processing of data collection and learning of a minority attribute.

Here, an example of collection of minority attribute data and a training process will be described with reference to FIG. 13. FIG. 13 is a flowchart illustrating an example of collection of minority attribute data and the training process. Hereinafter, processing described as having the data collection system 1 as the subject of processing may be performed by either the data collection device 100 or the sensor device 10 included in the data collection system 1.

As illustrated in FIG. 13, the data collection system 1 collects data of minority attribute (step S401). For example, in the data collection system 1, the sensor device 10 captures an image of a child and transmits the image to the data collection device 100 to collect an image of the minority attribute "child". With this operation, the data collection system 1 adds the image of the minority attribute "child" to accumulated data AD.

Subsequently, the data collection system 1 performs retraining (step S402). For example, in the data collection system 1, the data collection device 100 retrains the model (network) by using the accumulated data AD having the added image of the minority attribute "child" as the training data.

Subsequently, the data collection system 1 performs a data bias check (step S403). In a case where it is determined that there is data bias (step S403: there is the data bias), the data collection system 1 returns to step S401 and repeats the processing. In addition, in a case where it is determined that there is no data bias (step S403: No data bias), the data collection system 1 ends the retraining process.

In addition, the data collection system 1 replaces the network of the system with the network retrained in step S402. The data collection system 1 updates the parameters of the model (network) to the parameters after retraining performed in step S402.

As described above, when there is no data bias, the data collection system 1 does not need to collect any more data and ends the process. In a case where a data bias occurs, the data collection system 1 collects minority data. With a retrained network constructed by such a loop installed on automatic driving, it is possible to solve the AI ethics problem caused by data. With the data collection system 1, which used to have a difficulty recognizing a child, it is now possible to improve the recognition rate of the child by performing retraining.

[1-7. Displaying Judgment Basis, Etc.]

Next, real-time display of the judgment basis and the like will be described. Displaying a movie of a result or a judgment basis of deep learning in real time is a matter of importance. However, displaying a movie in real time on an image in deep learning requires very heavy processing load. For example, in person/object recognition, it is difficult to display a high-resolution movie such as 4K in real time. To handle this, by using the system (for example, the data collection system 1) having a configuration in which only a result of deep learning and a judgment basis are displayed on an output device OD (refer to FIG. 14) such as AR glasses or a transmissive monitor and videos of the real world are to be viewed without being displayed as an image, high-speed movie processing can be implemented.

For example, in a system (for example, the data collection system 1) that recognizes a person or an object using the sensor device 10 such as an in-vehicle camera, only a result of the recognized person or object and a judgment basis (for example, a bounding box or a heatmap) are to be displayed on the output device OD such as AR glasses or a transmissive monitor so as to be superimposed on the real world. The system having such a configuration (for example, the data collection system 1) is characterized in that processing is very light because a video of the outside of the vehicle in the real world is not captured in the display device. In addition, the system (for example, the data collection system 1) that recognizes a person or an object using the output device OD such as a VR glass has a viewing angle of 360 degrees in the entire celestial sphere, making it possible to achieve recognition in a wider range.

In recognition of a person or an object using a computer (information processing device), a low recognition rate of a minority data attribute can impair fairness. For example, occasions where the number of pieces of data is small, such as a case including not easily recognizable skin color or a small person such as a child would lead to occurrence of unfairness that the recognition rate in the person/object recognition is lower than that of the majority data attributes. Such unfairness would be an undesirable condition as AI ethics, having a possibility of causing a disadvantageous result for the minority data attribute.

For example, when an in-vehicle system has a situation in which a human with a skin color difficult to be easily recognized and a small person such as a child have low recognition rate, such a minority data attribute leads to a high probability of being involved in a traffic accident. To cope with this, there is a conceivable system that stores data captured by an in-vehicle camera and uploads the data to the cloud. By performing retraining with newly captured data and retraining on the cloud, the accuracy of the deep neural network can be improved. A problem at this time is protection of personal information.

For example, data captured by an in-vehicle camera may include a clear facial image. In addition, it may be difficult to obtain approval of a pedestrian imaged by an in-vehicle camera. In view of this, face recognition is performed on the video captured by the in-vehicle camera, and processing of automatically applying pixelation to the facial image or processing of reducing the resolution of the facial image is performed. By using a procedure of converting information into information by which an individual is not identifiable and then uploading the information to the cloud, it is possible to achieve both the protection of personal information and the utilization of data. The deep neural network including the additional data is retrained on the cloud. Subsequently, by updating and distributing the retrained deep neural network to the in-vehicle system, the accuracy of the model can be improved.

Figure 15:
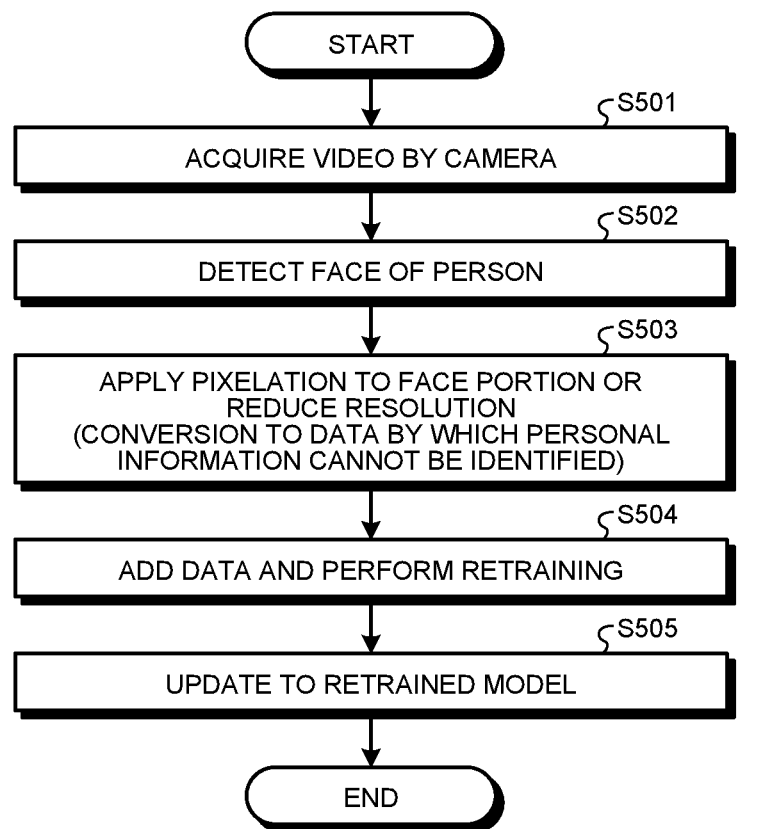
FIG. 15 is a flowchart illustrating an example of model update processing.

A processing example in a case where the above-described processing is performed by the data collection system 1 will be described with reference to FIG. 15. FIG. 15 is a flowchart illustrating an example of model update processing. In this case, the data collection system 1 includes at least a sensor device 10a being a mobile body as the sensor device 10. Hereinafter, processing described as having the data collection system 1 as the subject of processing may be performed by either the data collection device 100 or the sensor device 10 included in the data collection system 1.

As illustrated in FIG. 15, first, the data collection system 1 acquires a video with a camera (step S501). For example, the sensor device 10 acquires a video by imaging using the image sensor 161.

Subsequently, the data collection system 1 detects the face of a person (step S502). For example, the sensor device 10 detects the face of a person included in the video.

Subsequently, the data collection system 1 applies pixelation or reduces the resolution on a portion including the face (step S503). With this operation, the data collection system 1 converts the data into data in which individuality is unidentifiable. For example, the sensor device 10 executes processing of applying pixelation or reducing resolution onto the portion including the face.

Subsequently, the data collection system 1 adds data and performs retraining (step S504). For example, the data collection device 100 acquires data from the sensor device 10, adds the acquired data to the training data, and performs retraining.

Subsequently, the data collection system 1 updates the retrained model (step S505). For example, the data collection device 100 updates the parameters of the model (network) to the parameters after retraining in step S404.

2. OTHER EMBODIMENTS

The process according to each of embodiments described above may be performed in various different forms (modifications) in addition to each of embodiments or modifications described above.

[2-1. Other Configuration Examples]

Although the above example is a case where the data collection device 100 and the sensor device 10 are separated from each other, these devices may be integrated to each other. For example, the data collection device 100 may be a device including the sensor unit 16 and having a function of sensing and acquiring necessary data by the sensor unit 16 of the own device. The data collection device 100 may be a camera, a smartphone, a television, an automobile, a drone, a robot, AR glasses, or the like. In this manner, the data collection device 100 may be a sensor device that autonomously collects necessary data.

[2-2. Data]

In the above-described example, the image captured by the image sensor 161 has been described as an example of data. However, the data is not limited to the image, and may be data obtained by the sensing by various sensors. That is, the sensor may be a sensor that performs sensing of various types of data, not limited to the image sensor 161. For example, the sensor may be a sound sensor that performs sensing of a sound such as a microphone. In this case, the data collection device 100 requests the sensor device 10 for necessary audio data. The sensor device 10 acquires sound data by a sound sensor and transmits the sound data to the data collection device 100. The data collection device 100 trains a neural network (model) by using the acquired voice data as training data.

[2-2. Others]

Furthermore, among each processing described in the above embodiments, all or a part of the processing described as being performed automatically can be manually performed, or the processing described as being performed manually can be performed automatically by a known method. In addition, the processing procedures, specific names, and information including various data and parameters illustrated in the above specifications or drawings can be changed in any manner unless otherwise specified. For example, various types of information illustrated in each of the drawings are not limited to the information illustrated.

In addition, each of components of each device is provided as a functional and conceptual illustration and thus does not necessarily need to be physically configured as illustrated. That is, the specific form of distribution/integration of each device is not limited to those illustrated in the drawings, and all or a part thereof may be functionally or physically distributed or integrated into arbitrary units according to various loads and use conditions.

Furthermore, the above-described embodiments and modifications can be appropriately combined within a range implementable without contradiction of processing.

The effects described in the present specification are merely examples, and thus, there may be other effects, not limited to the exemplified effects.

3. EFFECTS ACCORDING TO PRESENT DISCLOSURE

As described above, the data collection system (the data collection system 1 in the embodiment) according to the present disclosure includes the sensor device (the sensor device 10 in the embodiment) that collects data, the learning model that performs output according to the learning result, corresponding to input, and the server device (the data collection device 100 in the embodiment) including the data analysis unit (the selection unit 131 in the embodiment) that specifies data that is beneficial or lacking for the training of the learning model. The server device transmits, to the sensor device, a request signal for collecting data beneficial or lacking in the training specified by the data analysis unit, or data similar to the data, the sensor device collects data beneficial to or lacking in the training or data similar to the data based on the received request signal, and transmits the collected data to the server device, and then the server device retrains the learning model based on the data transmitted from the sensor device.

In this manner, by requesting data from the sensor device and transmitting data corresponding to the request from the sensor device to the server device, the data collection system according to the present disclosure can collect desired data used for machine learning.

In addition, in data collection by the sensor device, the data collection system selects data satisfying at least a consent of the subject as a target of the data collection or a right holder of the data or a judgment criterion of a location where the data collection is performed, and transmits the selected data to the server device. In this manner, by transmitting data to the server device in response to a data request from the server device, the sensor device can collect desired data used for machine learning.

As described above, the sensor device according to the present disclosure, being a sensor device that collects data, includes a reception unit (the reception unit 151 in the embodiment) that receives, from an external device, a request signal for requesting data beneficial for or lacking in the training of a learning model used by a server device, or data similar to the data, and collects beneficial data, lacking data, or similar data based on the request signal, and transmits the collected data to the server device.

In this manner, by transmitting data to the server device in response to a request from the outside, the sensor device according to the present disclosure can collect desired data used for machine learning.

In addition, the sensor device transmits data satisfying at least a consent of the subject as a target of the data collection or a right holder of the data or a judgment criterion of a location where the data collection is performed, and transmits the selected data to the server device. In this manner, by transmitting data satisfying a predetermined condition to the server device, the sensor device can collect desired data used for machine learning.

Furthermore, the sensor device includes an image sensor (the image sensor 161 in the embodiment), changes the resolution, the luminance, the angle of view, or the frame rate of the data according to the request signal, and transmits the data to the server device. In this manner, by changing the resolution, the luminance, the angle of view, or the frame rate of the data according to the request signal and transmitting the changed data, the sensor device can collect desired data used for machine learning.

Furthermore, the sensor device according to the present disclosure includes a data processing unit (the data processing unit 153 in the embodiment), and transmits data subjected to predetermined processing to the server device by using the data processing unit. The data processing unit edits the collected data. In this manner, the sensor device can collect desired data by editing the collected data.

In addition, the data processing unit performs processing related to privacy protection. In this manner, by performing the processing related to privacy protection, the sensor device can collect desired data while protecting privacy of a person being a target of data collection.

The data processing unit deforms the face of the person included in the data. In this manner, by pixelating the face of the person, the sensor device can collect desired data while satisfying the collection condition related to privacy.

In addition, the data processing unit changes the face of one person to the face of another person different from the person. In this manner, by changing the face of one person to the face of another person, the sensor device can collect desired data while satisfying the collection condition related to privacy.

Furthermore, the image sensor acquires an image of the corresponding person, who corresponds to the minority attribute. In this manner, by acquiring the image of the corresponding person, who corresponds to the minority attribute, the sensor device can acquire the image required by the server device, leading to achievement of collection of desired data.

In addition, in the absence of the consent of the corresponding person, the data processing unit edits the face of the person in the data. In this manner, in a case where there is no consent of the corresponding person imaged in response to the request of the server device, by editing the face of the corresponding person, the sensor device can collect desired data while protecting privacy of the corresponding person.

As described above, the data collection device (the data collection device 100 in the embodiment) according to the present disclosure includes the transmission unit (the transmission unit 132 in the embodiment) and the reception unit (the reception unit 133 in the embodiment). The transmission unit transmits, to the sensor device, a request signal for collecting data beneficial for or lacking in the training of a learning model that performs output according to a learning result, corresponding to input, or data similar to the data. The reception unit receives data corresponding to the request signal, from the sensor device.

In this manner, by requesting data from the sensor device and receiving the data from the sensor device, the data collection device according to the present disclosure can collect desired data used for machine learning.

Furthermore, the data collection device according to the present disclosure includes a data analysis unit. The data analysis unit specifies data beneficial for or lacking in the learning. In this manner, by specifying necessary data and requesting the data from the sensor device, the data collection device can collect desired data used for machine learning.

Furthermore, the data collection device according to the present disclosure includes a training unit (the training unit 135 in the embodiment). The training unit adds the data received from the sensor device to the training data and executes a training process on the neural network using the training data including the added data. In this manner, by executing the training process on the neural network using the training data including the added data obtained from the sensor device, the data collection device can perform the training using the training data that can train a model into a high accuracy model.

Furthermore, the transmission unit requests data from a sensor device having an image sensor. In this manner, by requesting data from a sensor device having an image sensor, the data collection device can collect desired data used for machine learning.

The reception unit receives data containing a person from the sensor device. In this manner, the data collection device can collect data containing a person.

Furthermore, the data collection device according to the present disclosure includes an information processing unit (the information processing unit 134 in the embodiment). The information processing unit changes the face of a person to the face of another person different from the person. In this manner, by changing the face of a person in the data to the face of another person different from the person, the data collection device can collect desired data while protecting privacy of a captured person.

Furthermore, in a case where the face of a person is pixelated, the information processing unit changes the pixelated region to the face of another person. In this manner, by changing the pixelated region to the face of another person, the data collection device can use the data containing the face of another person other than the imaged person for the learning, making it possible to train the model to a high accuracy model while protecting the privacy of the imaged person.

4. HARDWARE CONFIGURATION

Figure 16:
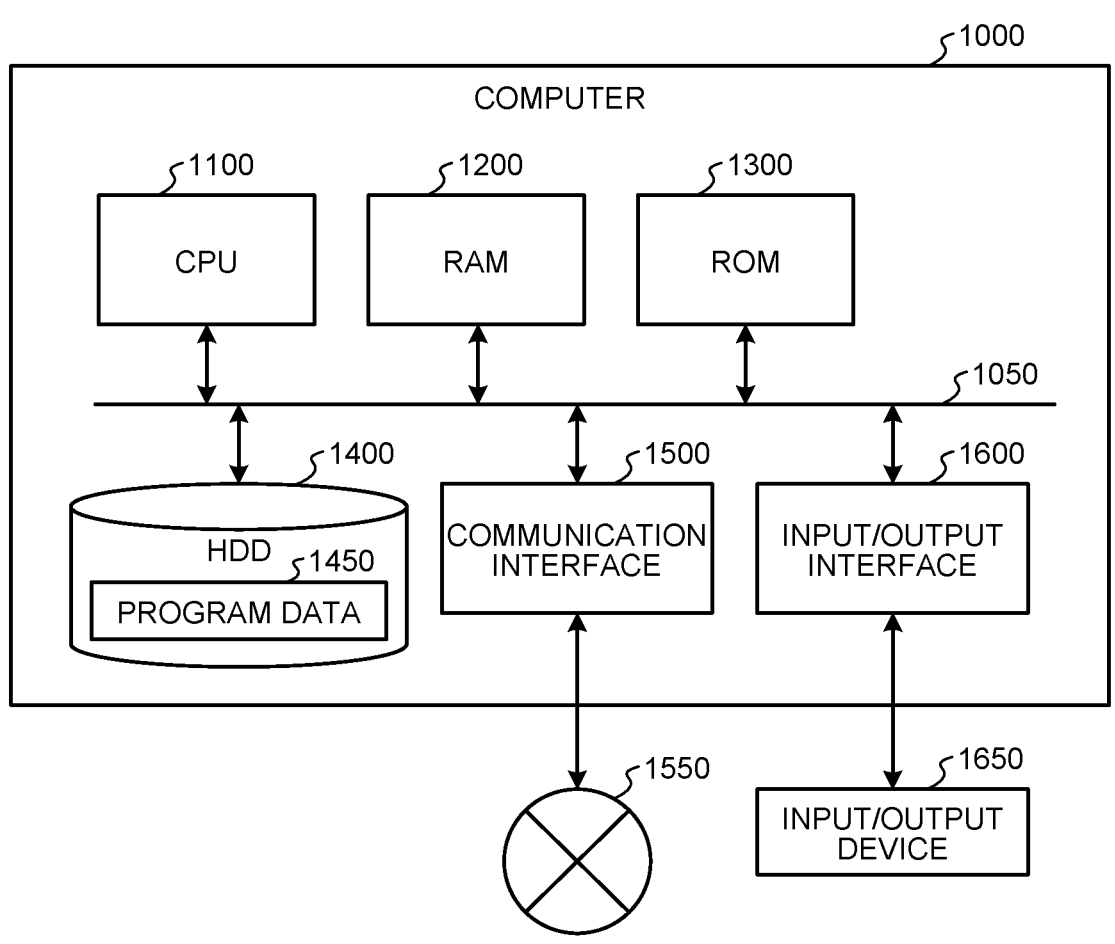
FIG. 16 is a hardware configuration diagram illustrating an example of a computer implementing functions of information devices such as a data collection device and a sensor device.

The information devices such as the data collection device 100, the sensor device 10, and the output device OD according to each of the above-described embodiments and modifications are implemented by a computer 1000 having a configuration as illustrated in FIG. 16, for example. FIG. 16 is a hardware configuration diagram illustrating an example of a computer implementing functions of information devices such as a data collection device and a sensor device. Hereinafter, the data collection device 100 according to the embodiment will be described as an example. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting an input/output device 1650 with the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the data collection device 100 according to the embodiment, the CPU 1100 of the computer 1000 executes the information processing program loaded on the RAM 1200 so as to implement the functions of the control unit 130 and the like. Furthermore, the HDD 1400 stores the information processing program according to the present disclosure or data in the storage unit 120. While the CPU 1100 executes program data 1450 read from the HDD 1400, the CPU 1100 may acquire these programs from another device via the external network 1550, as another example.

Note that the present technique can also have the following configurations.

(1)

A data collection system comprising:

a sensor device that collects data; and a server device including: a learning model that performs output according to a learning result, corresponding to input; and a data analysis unit that specifies data that is beneficial for or lacking in training of the learning model, wherein the server device transmits, to the sensor device, a request signal for collecting data that is beneficial for or lacking in the training specified by the data analysis unit, or data similar to the data, the sensor device collects data that is beneficial for or lacking in the training, or similar data based on the received request signal, and transmits the collected data to the server device, and the server device retrains the learning model based on the data transmitted from the sensor device.

(2)

The data collection system according to (1), wherein in data collection by the sensor device, the data collection system selects data satisfying at least a consent of a subject as a target of the data collection or a right holder of the data, or a judgment criterion of a location where the data collection is performed, and transmits the selected data to the server device.

(3)

A sensor device that collects data, the sensor device comprising a reception unit that receives, from an external device, a request signal for requesting data beneficial for and lacking in training a learning model used by a server device, or data similar to the data, the sensor device configured to collect the beneficial data, the lacking data, or similar data based on the request signal and transmit the collected data to the server device.

(4)

The sensor device according to (3), the sensor device configured to select data satisfying at least a consent of a subject as a target of the data collection or a right holder of the data, or a judgment criterion of a location where the data collection is performed and transmit the selected data to the server device.

(5)

The sensor device according to (3) or (4), further comprising an image sensor, the sensor device configured to change resolution, luminance, an angle of view, or a frame rate according to the request signal and performs transmission to the server device.

(6)

The sensor device according to (5), further comprising a data processing unit that edits collected data;

the sensor device configured to transmit, by the data processing unit, data that has undergone predetermined processing to the server device.

(7)

The sensor device according to (6), wherein the data processing unit performs processing related to privacy protection.

(8)

The sensor device according to (7), wherein the data processing unit deforms a face of a person contained in data.

(9)

The sensor device according to (8), wherein the data processing unit applies pixelation to the face of the person.

(10)

The sensor device according to (9), wherein the data processing unit change the face of the person to a face of another person different from the person.

The sensor device according to any one of (6) to (10), wherein the image sensor acquires an image of a corresponding person who corresponds to a minority attribute.

(12)

The sensor device according to (11), wherein the data processing unit changes the face of the corresponding person in the data when consent of the corresponding person has not been obtained.

(13)

A data collection device comprising:

a transmission unit that transmits, to a sensor device, a request signal for collecting data that is beneficial for or lacking in the training of a learning model that performs output according to a learning result, corresponding to input, or data similar to the data; and a reception unit that receives data corresponding to the request signal, from the sensor device.

(14)

The data collection device according to (13), further comprising a data analysis unit that specifies the data beneficial for or lacking in the training, wherein the transmission unit requests the sensor device for data specified by the data analysis unit.

(15)

The data collection device according to (13) or (14), further comprising a training unit that adds data received from the sensor device to training data and executes a training process on a neural network by using the added training data.

(16)

The data collection device according to any one of (13) to (15), wherein the transmission unit requests data from the sensor device including an image sensor.

(17)

The data collection device according to (16), wherein the reception unit receives data including a person from the sensor device.

(18)

The data collection device according to (17), further comprising an information processing unit that changes a face of the person to a face of another person different from the person.

(19)

The data collection device according to (18), wherein, in a case where the face of the person is pixelated, the information processing unit changes the pixelated region to the face of the another person.

(20)

A data collection method comprising:

collecting data by a sensor device;

performing a transmission to the sensor device, by using a server device including a learning model that performs output according to a learning result, corresponding to input, and a data analysis unit that specifies data that is beneficial for or lacking in training of the learning model, the transmission being a transmission of a request signal for collecting data that is beneficial for or lacking in the training specified by the data analysis unit, or data similar to the data;

collecting, by the sensor device, data that is beneficial for or lacking data for the training, or similar data, based on the received request signal and transmitting the collected data to the server device; and performing, by the server device, retraining of the learning model based on the data transmitted from the sensor device.

REFERENCE SIGNS LIST

1 DATA COLLECTION SYSTEM
100 DATA COLLECTION DEVICE (SERVER DEVICE)
110 COMMUNICATION UNIT
120 STORAGE UNIT
121 DATA INFORMATION STORAGE UNIT
122 MODEL INFORMATION STORAGE UNIT
123 MINORITY ATTRIBUTE INFORMATION STORAGE UNIT
130 CONTROL UNIT
131 SELECTION UNIT (DATA ANALYSIS UNIT)
132 TRANSMISSION UNIT
133 RECEPTION UNIT
134 INFORMATION PROCESSING UNIT
135 TRAINING UNIT
10 SENSOR DEVICE
11 COMMUNICATION UNIT
12 INPUT UNIT
13 OUTPUT UNIT
14 STORAGE UNIT
141 COLLECTION CONDITION STORAGE UNIT
142 DATA STORAGE UNIT
15 CONTROL UNIT
151 RECEPTION UNIT
152 ACQUISITION UNIT
153 DATA PROCESSING UNIT
154 TRANSMISSION UNIT
16 SENSOR UNIT (SENSOR)

The invention claimed is:

1. A data collection system, comprising:

a sensor device configured to collect first data; and a server device including:

a learning model configured to generate an output based on a learning result corresponding to an input of the learning model; and circuitry configured to:

determine minority attribute data based on training data of the learning model, wherein the determined minority attribute data has a proportion smaller than a specific threshold in the training data of the learning model;

transmit, to the sensor device, a request signal that indicates the determined minority attribute data, wherein the sensor device is further configured to:

collect second corresponding to the minority attribute data based on the request signal and the first data; and transmit the collected second data to the server device; and train the learning model based on the second data.

2. The data collection system according to claim 1, wherein the sensor device is further configured to:

select, as the second data, third data that satisfies at least one of a consent of a subject or a consent of a right holder of the third data, or a judgment criterion of a location associated with the third data; and transmit the selected third data to the server device.

3. A sensor device, comprising:

circuitry configured to:

collect first data;

receive, from a server device, a request signal that indicates:

minority attribute data of training data of a learning model, and a required number of pieces of the minority attribute data, wherein the learning model is associated with the server device;

collect, based on the first data and the request signal, second corresponding to the minority attribute data, wherein the second data includes the required number of pieces of the minority attribute data; and transmit the collected second data to the server device.

4. The sensor device according to claim 3, the circuitry is further configured to:

select, as the second data, third data that satisfies at least one of a consent of a subject or a consent of a right holder of the third data, or a judgment criterion of a location associated with the third data; and transmit the selected third data to the server device.

5. The sensor device according to claim 3, further comprising an image sensor configured to acquire image data, wherein the circuitry is further configured to:

change, based on the request signal, at least one of a resolution of the image data, luminance of the image data, an angle of view of the image data, or a frame rate of the image data; and transmit, based on the change, the image data to the server device.

6. The sensor device according to claim 5, wherein the circuitry is further configured to:

edit the acquired image data based on a specific process; and transmit the edited image data to the server device.

7. The sensor device according to claim 6, wherein the circuitry is further configured to execute the specific process related to privacy protection.

8. The sensor device according to claim 7, wherein the acquired image data includes an image of a first person, and the circuitry is further configured to deform a face of the first person in the image.

9. The sensor device according to claim 8, wherein the circuitry is further configured to apply pixelation to the face of the first person.

10. The sensor device according to claim 9, wherein the circuitry is further configured to change the face of the first person to a face of a second person, and the second person is different from the first person.

11. The sensor device according to claim 6, wherein the image sensor is further configured to acquire the image data that includes an image of a person, and an attribute of the person corresponds to a minority attribute associated with the minority attribute data.

12. The sensor device according to claim 10, wherein the circuitry is further configured to change the face of the first person in the image based on an absence of a consent of the first person.

13. A data collection device, comprising:

a learning model configured to generate an output based on a learning result corresponding to an input of the learning model; and circuitry configured to:

determine minority attribute data based on training data of the learning model, wherein the determined minority attribute data has a proportion smaller than a specific threshold in the training data of the learning model;

transmit, to a sensor device, a request signal that indicates the determined minority attribute data;

receive, from the sensor device, data corresponding to the minority attribute data, wherein the reception of the data is based on the transmitted request signal; and train the learning model based on the received data.

14. The data collection device according to claim 13, wherein the learning model includes a neural network, and the circuitry is further configured to:

add the received data to the training data; and execute, based on the training data that includes the received data, a training process on the neural network.

15. The data collection device according to claim 13, wherein the sensor device includes an image sensor.

16. The data collection device according to claim 15, wherein the circuitry is further configured to receive, from the sensor device, the data including an image of a first person.

17. The data collection device according to claim 16, wherein the circuitry is further configured to change, in the image, a face of the first person to a face of a second person, and the second person is different from the first person.

18. The data collection device according to claim 17, wherein, in a case where the face of the first person is pixelated in the image, the circuitry is further configured to change a pixelated region of the image to the face of the second person.

19. A data collection method, comprising:

in a data collection system that includes a server device including a learning model configured to generate an output based on a learning result corresponding to an input of the learning model, and a sensor device:

collecting first data by the sensor device;

determining, by the server device, minority attribute data based on training data of the learning model, wherein the determined minority attribute data has a proportion smaller than a specific threshold in the training data of the learning model;

transmitting, the server device, a request signal that indicates the determined minority attribute data, wherein the request signal is transmitted to the sensor device;

collecting, by the sensor device, second data corresponding to the minority attribute data based on the request signal and the first data;

transmitting, by the sensor device, the collected second data to the server device; and training, by the server device, the learning model based on the second data.

* * * * *